(12) United States Patent
Grimm et al.

(10) Patent No.: US 10,865,049 B2
(45) Date of Patent: Dec. 15, 2020

(54) TRANSPORTABLE CONVEYOR APPARATUS, SYSTEMS, AND METHODS

(71) Applicant: Superior Industries, Inc., Morris, MN (US)

(72) Inventors: Lafe Grimm, Hancock, MN (US); Philip Rosen, Barrett, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 16/312,421

(22) PCT Filed: Jun. 21, 2017

(86) PCT No.: PCT/US2017/038623
§ 371 (c)(1),
(2) Date: Dec. 21, 2018

(87) PCT Pub. No.: WO2017/223253
PCT Pub. Date: Dec. 28, 2017

(65) Prior Publication Data
US 2019/0202641 A1    Jul. 4, 2019

Related U.S. Application Data

(60) Provisional application No. 62/502,223, filed on May 5, 2017, provisional application No. 62/353,011, filed on Jun. 21, 2016.

(51) Int. Cl.
*B65G 41/00* (2006.01)
*B65G 21/14* (2006.01)

(52) U.S. Cl.
CPC .......... *B65G 41/005* (2013.01); *B65G 21/14* (2013.01)

(58) Field of Classification Search
None
See application file for complete search history.

(56) References Cited

U.S. PATENT DOCUMENTS

| | | | |
|---|---|---|---|
| 3,444,987 A * | 5/1969 | Palmer | B65G 21/14 198/301 |
| 3,606,944 A | 9/1971 | Cadillac | |
| 3,616,893 A | 11/1971 | Knadle | |

(Continued)

FOREIGN PATENT DOCUMENTS

| | | |
|---|---|---|
| CA | 1046969 A | 1/1979 |
| DE | 800740 C | 12/1950 |

(Continued)

OTHER PUBLICATIONS

International Search Report from the International Bureau; PCT Application No. PCT/US2017/038623, dated Oct. 30, 2017; 26 pages.

(Continued)

*Primary Examiner* — Kavel Singh
(74) *Attorney, Agent, or Firm* — Todd R. Fronek; Larkin Hoffman Daly & Lindgren Ltd.

(57) ABSTRACT

Conveyor apparatus, systems and methods are provided. Some embodiments include pivot assemblies for folding a conveyor frame between transport and operational configurations. In some embodiments, one or more frame sections of the conveyor frame are sized to be received in a shipping container.

30 Claims, 22 Drawing Sheets

(56) References Cited

U.S. PATENT DOCUMENTS

| | | | |
|---|---|---|---|
| 4,245,732 A * | 1/1981 | Couperus | B65G 21/14 |
| | | | 198/313 |
| 6,119,847 A * | 9/2000 | Mooney | B65G 33/32 |
| | | | 198/313 |
| 6,186,311 B1 | 2/2001 | Conner | |
| 6,296,109 B1 | 10/2001 | Nohl | |
| 6,360,876 B1 * | 3/2002 | Nohl | B65G 41/008 |
| | | | 198/302 |
| 7,284,947 B1 | 10/2007 | Felton | |
| 9,156,617 B2 | 10/2015 | Fehr et al. | |
| 10,087,011 B2 * | 10/2018 | Toth | B65G 15/14 |
| 2012/0080293 A1 | 4/2012 | Webb et al. | |

FOREIGN PATENT DOCUMENTS

| | | |
|---|---|---|
| DE | 832573 C | 2/1952 |
| DE | 20112570 U1 | 3/2003 |
| EP | 2894116 A1 | 7/2015 |

OTHER PUBLICATIONS

Extended European Search Report from European Patent Office, Application No. 17816176.6, dated Jan. 24, 2020, 9 pages.

\* cited by examiner

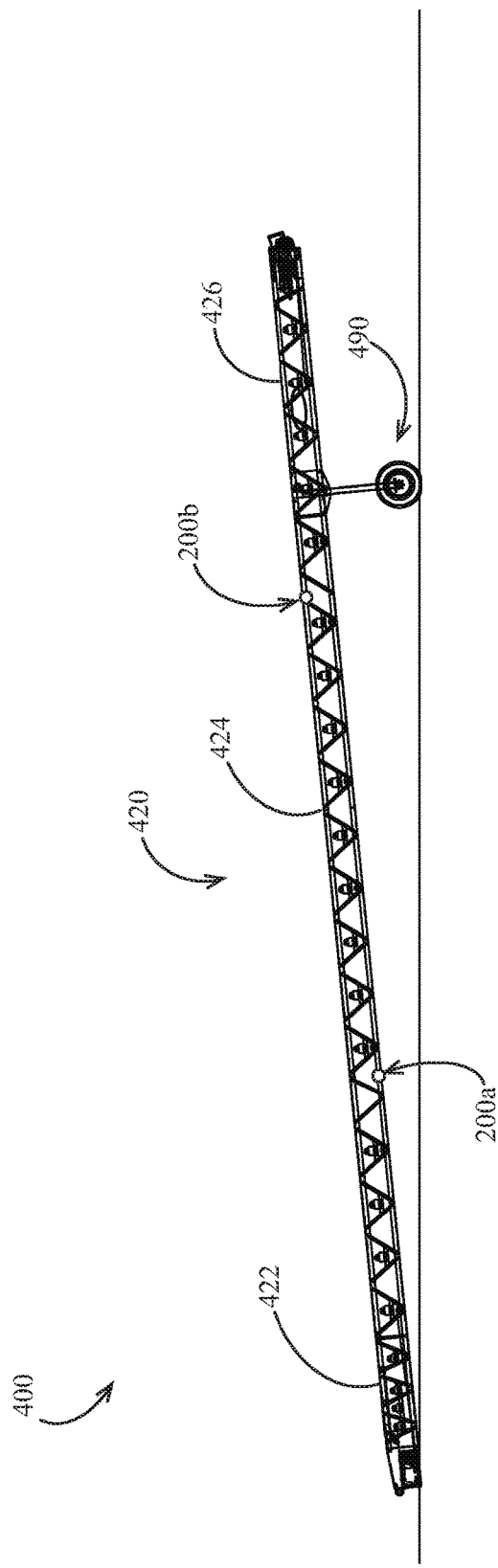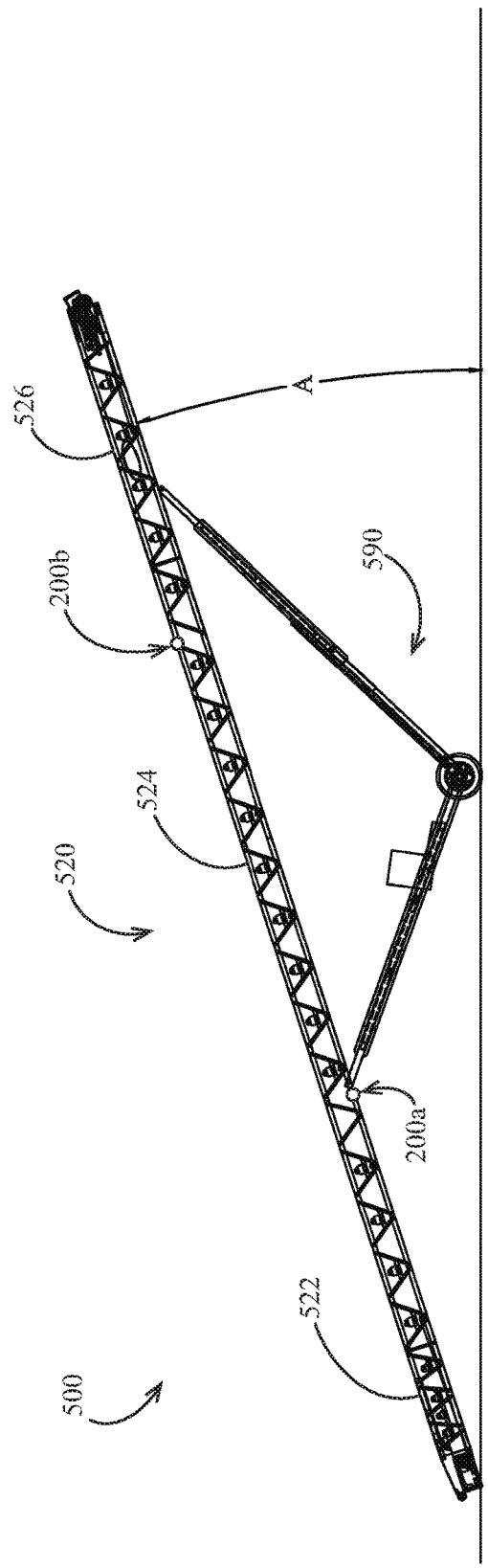

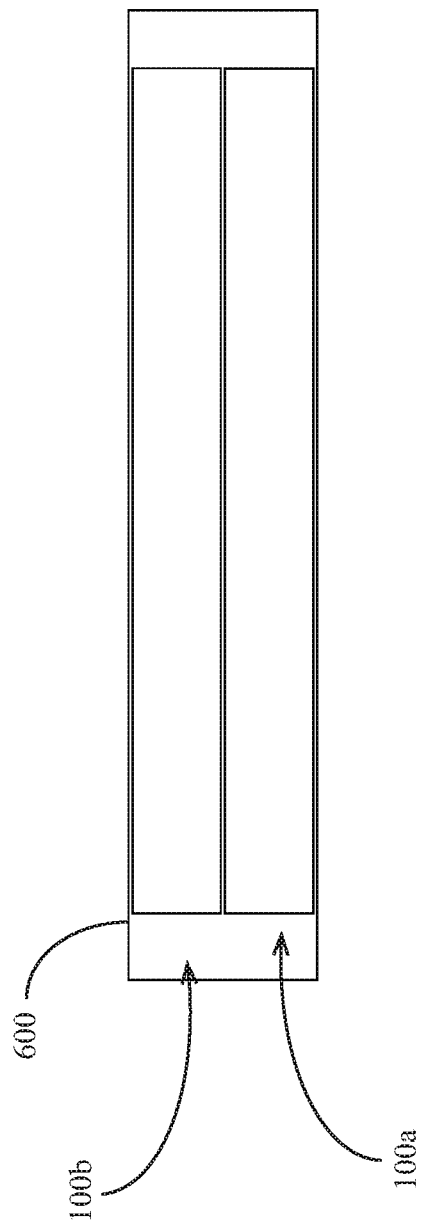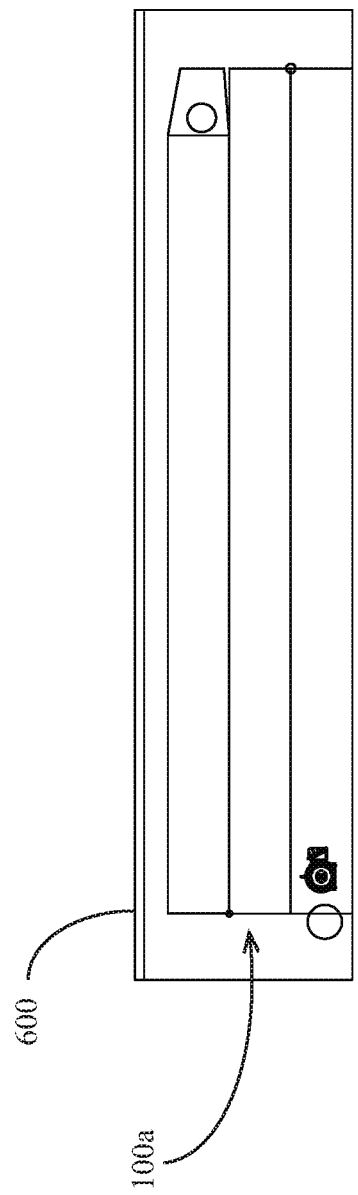

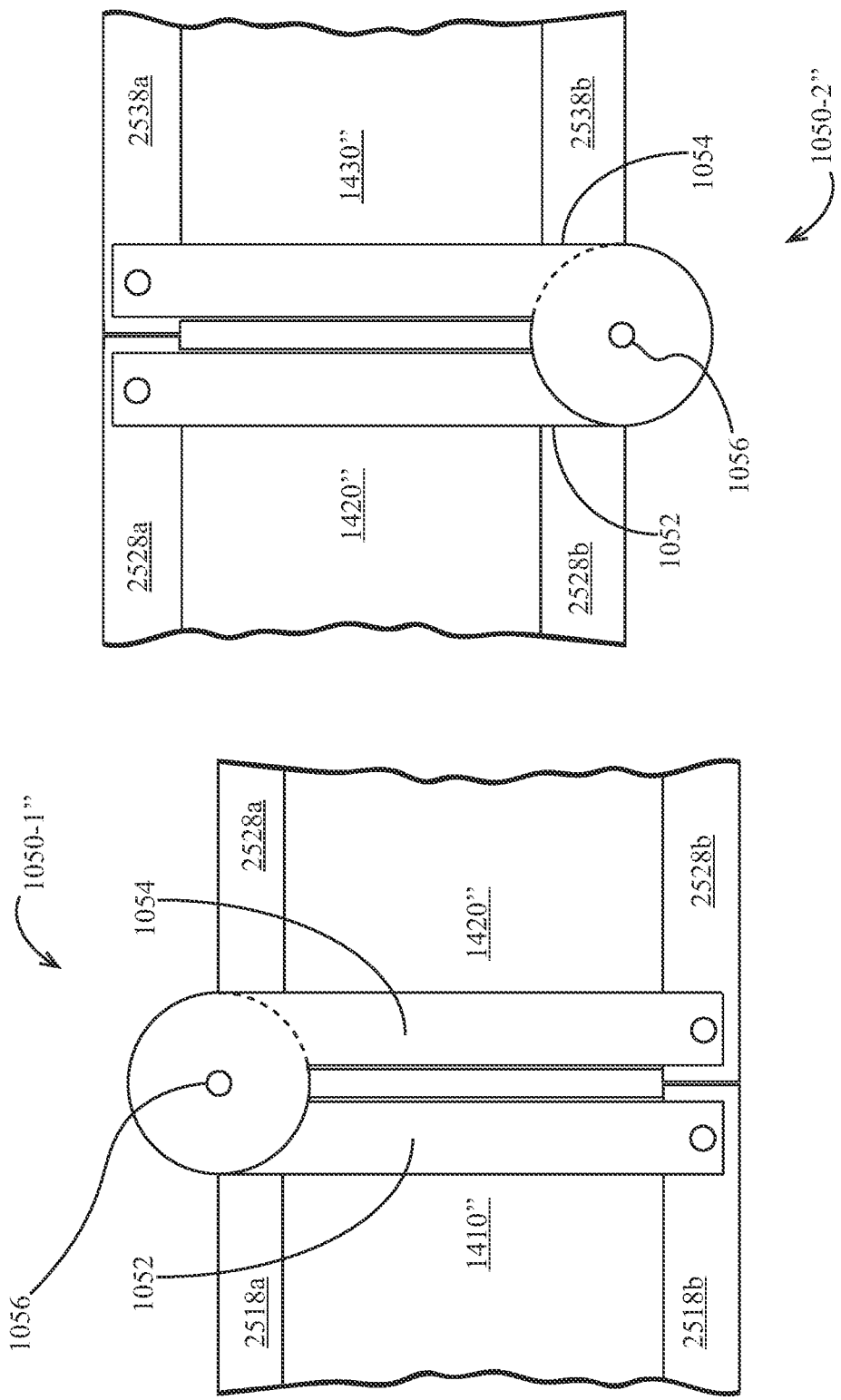

TRANSPORTABLE CONVEYOR APPARATUS, SYSTEMS, AND METHODS

BRIEF DESCRIPTION OF THE DRAWINGS

FIG. 4 is a side elevation view of an embodiment of a folding conveyor in an operational configuration.

FIG. 5 is a side elevation view of an embodiment of a folding conveyor in an operational configuration.

FIG. 8 is a plan view of a plurality of conveyors in a transport configuration stored in a container.

FIG. 9 is a side elevation view of a conveyor in a transport configuration stored in a container.

FIG. 27 is a side elevation view of an embodiment of a pivot assembly on an embodiment of a conveyor truss.

FIG. 28 is a side elevation view of an embodiment of a pivot assembly on an embodiment of a conveyor truss.

DESCRIPTION

Figure 2:
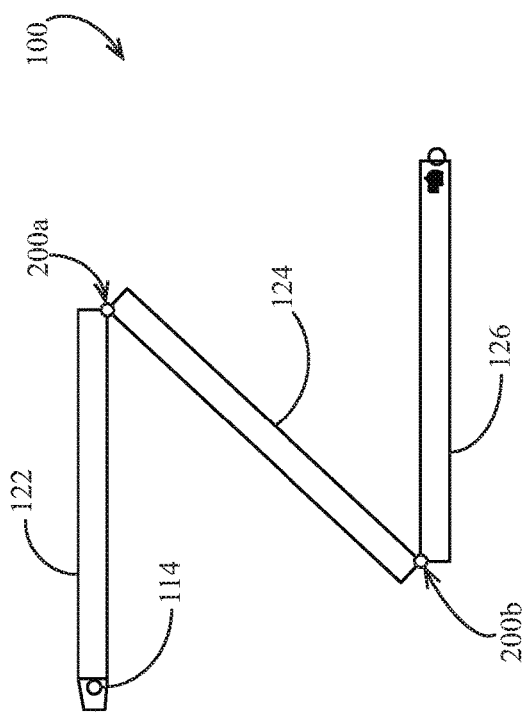
FIG. 2 is a side elevation view of the folding conveyor of FIG. 1 in a transitional configuration between a transport and an operational configuration.
Figure 1:
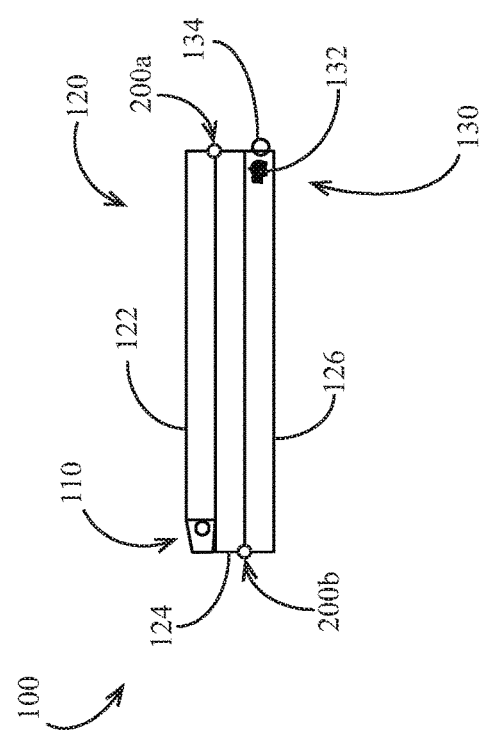
FIG. 1 is a side elevation view of an embodiment of a folding conveyor in a transport configuration.
Figure 3:
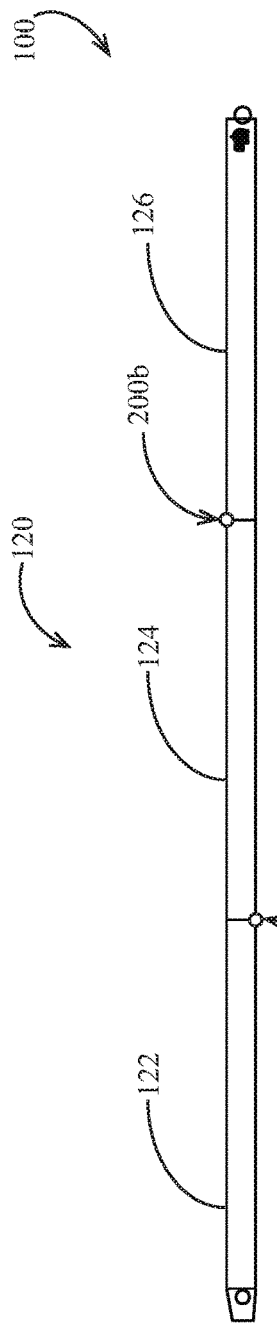
FIG. 3 is a side elevation view of the folding conveyor of FIG. 1 in an operational configuration.

Referring to the drawings, wherein like reference numerals designate identical or corresponding parts throughout the several views, FIGS. 1-3 schematically illustrate a conveyor 100 having a tail end 110 to which material is supplied and a head end 130 from which material is deposited (e.g., by a conveyor belt extending along the length of the conveyor). The head end 130 optionally includes a forward pulley 134. The forward pulley 134 is optionally driven by a motor 132. In operation, a conveyor belt (not shown) is optionally driven about the driven forward pulley 134 and the rear pulley 114. In other embodiments the rear pulley 114 may alternatively or additionally be driven by a motor or other mechanism. A tow eye (not shown) is optionally provided at or near the tail end 110 and/or to the forward end or other part of the conveyor for towing and/or reconfiguration of the conveyor 100.

The conveyor 100 optionally has a conveyor frame 120 comprised of a plurality of sections. The sections of the conveyor frame 120 are optionally foldable about pivotal connections. The sections of the conveyor frame 120 is optionally selectively foldable between a transport configuration (e.g., as illustrated in FIG. 1) and an operational configuration (e.g., as illustrated in FIG. 3). In the transport configuration, the sections are optionally stacked such that each section is disposed generally parallel to the other sections.

In the illustrated embodiment, the conveyor frame 120 comprises tail section 122, a medial section 124, and a head section 126. The tail section 122 is optionally pivotally coupled to the medial section 124 by a pivot assembly 200a. The pivot assembly 200a is optionally disposed generally at an underside of the conveyor frame 120 on the view of FIG. 3, and optionally defines a pivot axis generally beneath (and/or on an lower side of) the conveyor frame when the conveyor frame is in a horizontal orientation. The medial section 124 is optionally pivotally coupled to the head section 126 by a pivot assembly 200b. The pivot assembly 200b is optionally disposed generally at an upper side of the conveyor frame 120 on the view of FIG. 3, and optionally defines a pivot axis disposed at an upper end of the conveyor frame (and/or at least partially above the conveyor frame) when the conveyor frame is in a horizontal orientation. In other embodiments, the vertical positions of the pivot assemblies 200a, 200b may be reversed from those shown in the illustrated embodiment. In some embodiments, the conveyor frame comprises two or more frame sections optionally foldable about pivot assemblies in order to stack the conveyor frame (e.g., reconfigure the conveyor frame from an operational configuration to a transport configuration).

Turning to FIG. 4, a conveyor 400 is shown having a support assembly 490 rollingly supporting the conveyor at an incline angle relative to the ground. The conveyor 400 optionally includes a conveyor frame 420 having a tail section 422 pivotally coupled to a medial section 424 by a pivot assembly 200a. The conveyor frame 420 optionally includes a head section 426 pivotally coupled to the medial section 424 by a pivot assembly 200b. The upper and lower positions of the pivot assemblies may be reversed in other embodiments.

Turning to FIG. 5, a conveyor 500 is shown having a support assembly 590 rollingly supporting the conveyor and optionally including an actuator for selectively adjusting an incline angle A of the conveyor relative to the ground. The conveyor 500 optionally includes a conveyor frame 520 having a tail section 522 pivotally coupled to a medial section 524 by a pivot assembly 200a. The conveyor frame 520 optionally includes a head section 526 pivotally coupled to the medial section 524 by a pivot assembly 200b. The upper and lower positions of the pivot assemblies may be reversed in other embodiments.

Figure 7:
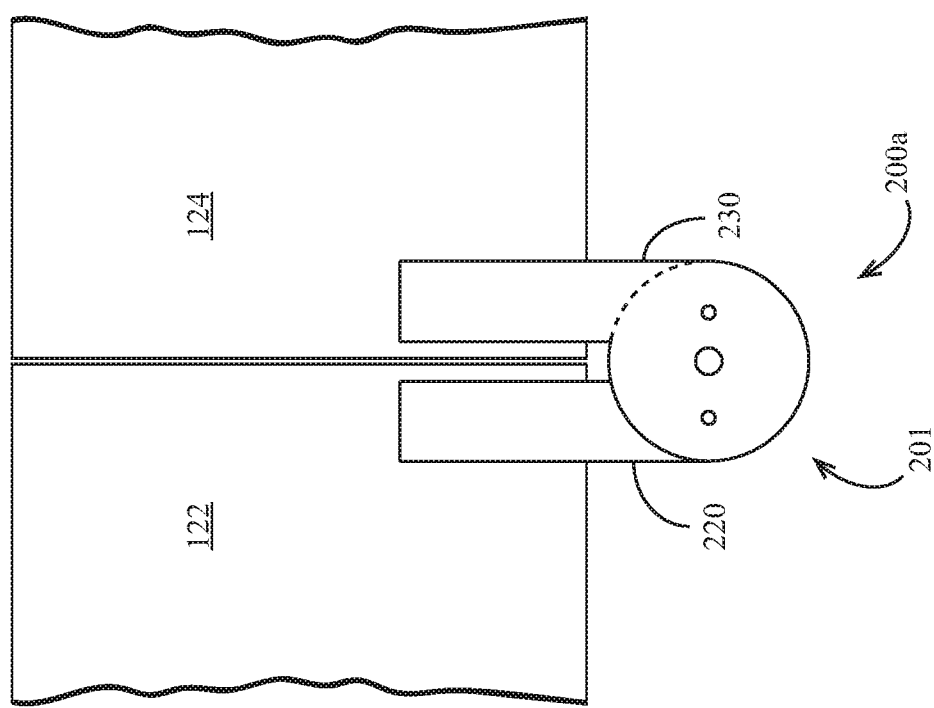
FIG. 7 is a side elevation view of an embodiment of a pivot assembly mounted to a conveyor frame.
Figure 6:
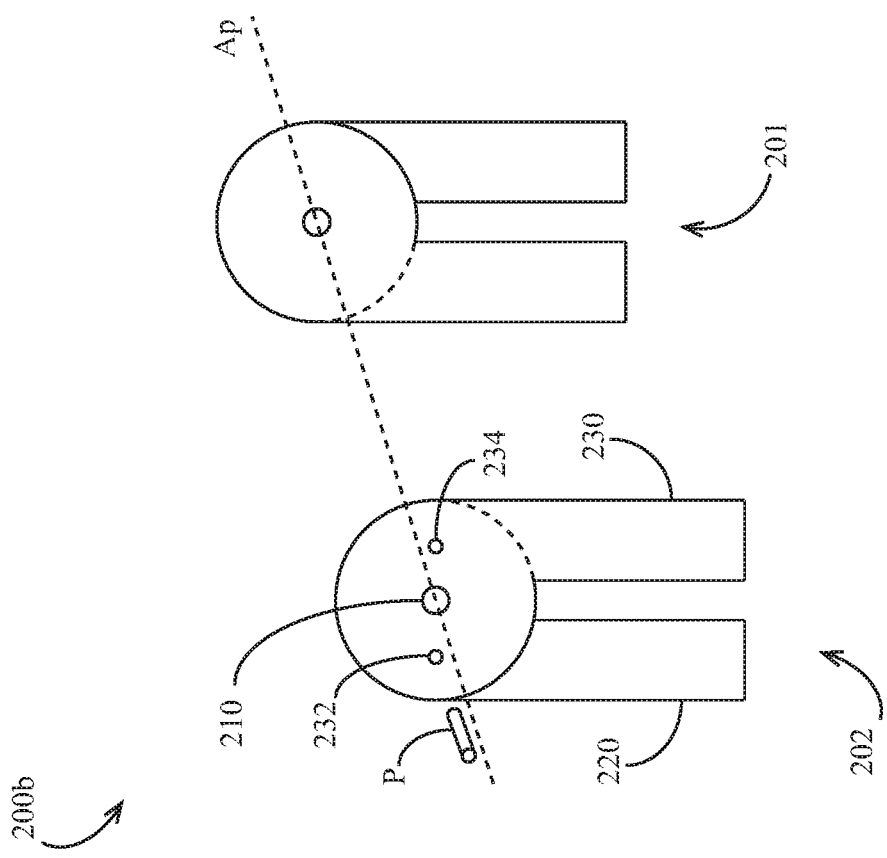
FIG. 6 is a perspective view of an embodiment of a pivot assembly.

Turning to FIGS. 6 and 7, the pivot assemblies 200a and 200b are shown in more detail according to one embodiment. The pivot assemblies 200 may comprise one or more pairs of pivot plates 220, 230. First pivot plate 220 is optionally mounted (e.g., by welding) to a first section of the conveyor frame (e.g., the tail section 122 as illustrated in FIG. 7). Second pivot plate 230 is optionally mounted (e.g., by welding) to a second section of the conveyor frame (e.g., the medial section 124 as illustrated in FIG. 7). The pivot plates 220, 230 are optionally pivotally connected about a joint 210 such that the associated conveyor sections may pivot about the joint 210. Each joint 210 optionally defines a pivot axis Ap which is optionally generally at a lower end of (and/or at least partially below) the conveyor frame 120 in the assembly 200a and optionally generally at an upper end of (and/or at least partially above) the conveyor frame 120 in the assembly 200b.

As shown in FIG. 6, the pivot assemblies 200 may comprise a first plate subassembly 201 disposed generally on a first lateral side of the conveyor and a second plate subassembly 202 disposed generally on a second lateral side of the conveyor. The joints 210 in the first and second subassemblies are optionally aligned along the pivot axis Ap.

The pivot assemblies 200 may be selectively lockable in the transport and/or operational configurations. For selectively locking the conveyor frame 120 in the operational configuration, the pivot plate 230 optionally includes an opening 232 which may be aligned with a corresponding opening (not shown) in the pivot plate 220 such that the relative position of the openings may be selectively locked or unlocked (e.g., by inserting or removing a pin P). For selectively locking the conveyor frame 120 in the transport configuration, the pivot plate 230 optionally includes an opening 234 which may be aligned with a corresponding opening (not shown) in the pivot plate 220 such that the relative position of the openings may be selectively locked or unlocked (e.g., by inserting or removing the pin P). As described with respect to other embodiments herein, in alternative embodiments the frame sections may be selectively locked to one another (e.g., by fasteners such as bolts).

In alternative embodiments, the pivot assemblies 200 may comprise one or more pivot structures disclosed in U.S. Pat. Nos. 9,156,617 and 6,296,109, the entire disclosures of which incorporated by reference herein in their entirety.

Turning to FIGS. 8 and 9, conveyors 100a and 100b are shown in their transport configurations stored in a container 600 (e.g., a sea container, cargo trailer, etc.). A height of the conveyor 100 in the transport configuration (e.g., the cumulative height of the conveyor frame sections) is optionally less than a standard container height dimension, e.g., a minimum height (and/or inlet portal height) of a standard container. The standard container height dimension may be 7.5 feet or approximately 7.5 feet (e.g., 2.394 meters or 2.280 meters). A width of the conveyor 100 in the transport configuration (e.g., the width of the widest conveyor frame section) is optionally less than a standard container width dimension, e.g., a minimum width (and/or inlet portal width) of a standard container. The standard container width dimension may be 7.5 feet or approximately 7.5 feet (e.g., 2.343 meters or 2.352 meters). In some embodiments, the width of the conveyor 100 may be less than one half of the standard container width dimension such that a plurality of conveyors 100a, 100b may be stored in the container as illustrated in FIG. 8. A length of the conveyor 100 in the transport configuration (e.g., the length of the longest conveyor frame section which in some embodiments may be the first, second or third frame section) is optionally less than a standard container length dimension, e.g., a minimum length (and/or inlet portal length) of a standard container. The standard container length dimension may be 40 feet or approximately 40 feet (e.g., 12.031 meters).

Referring to FIGS. 10-13, a conveyor 1000 is illustrated having a conveyor frame 1002 comprising two frame sections 1010 and 1020. The frame sections 1010, 1020 optionally fold relative to one another about a hinge 1050. The hinge 1050 optionally joins upper portions (e.g., upper truss chords) of the frame sections 1010, 1020. In the various embodiments described herein, each chord of the conveyor frame may comprise any structure such as an angle (see FIG. 19), I-beam, square beam, rectangular beam, beam, partial beam, channel beam, channel, or assembly or combination of structures. The hinge 1050 may comprise one of the hinge embodiments described elsewhere herein. The frame sections 1010, 1020 each support a plurality of idler assemblies 1100 (e.g., 1100a and 1100d) configured to operably support an endless belt B. A subset 1014 of idler assemblies (e.g., in a loading zone near a rearward end of the conveyor) are optionally closer together than the other idler assemblies. The frame section 1010 operably supports a tail pulley assembly 1090. The frame section 1020 operably supports a head pulley assembly 1022. The head and tail pulley assemblies cooperatively support the belt B in operation; in some embodiments the head pulley assembly 1022 is driven by a motor in order to advance the belt B.

Figure 19:
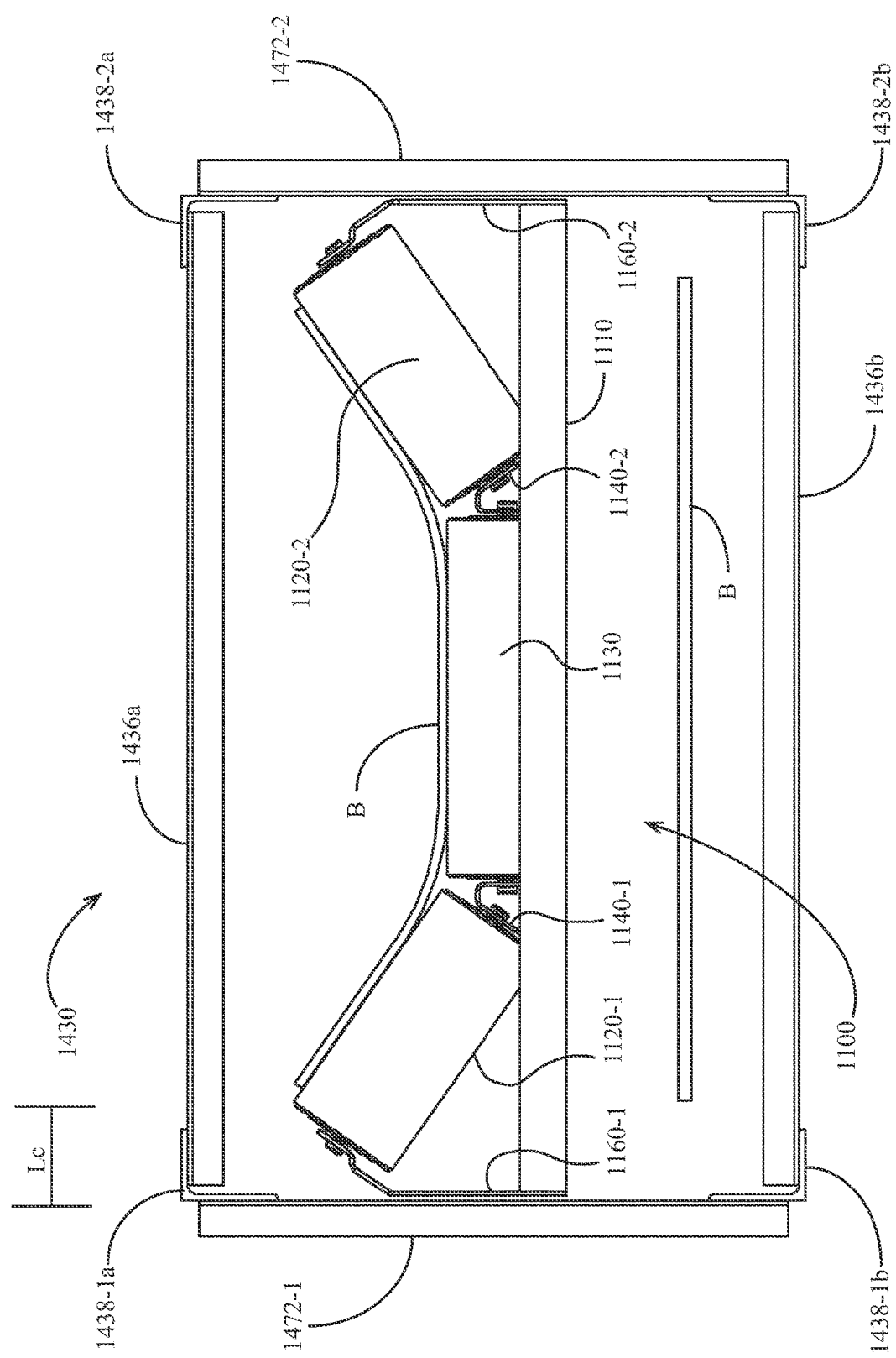
FIG. 19 is a view along section 17-17 of FIG. 17 showing a frame section of the conveyor of FIG. 14.

Referring to FIG. 19, one or more idler assemblies 1100 optionally comprises a troughing idler assembly as illustrated. The idler assembly 1100 optionally comprises a horizontal medial roll 1130 which may be rollingly (or rotationally) supported on left and right inner perch supports 1140-1, 1140-2. The idler assembly optionally comprises a left angled roll 1120-1 rollingly supported on an outer perch support 1160-1 and an inner perch support 1140-1. The idler assembly 1100 optionally comprises a right angled roll 1120-2 rollingly supported on a right inner perch support 1140-2 and a right outer perch support 1160-2. The inner and outer perch supports 1140, 1160 are optionally supported on a cross brace 1110. The belt B is optionally operably supported in a generally troughing shape on the rolls 1120, 1130; e.g., the rolls 1120, 1130 optionally roll as the belt B moves longitudinally (e.g., along conveyance direction Dc) over the rolls. It should be appreciated that although the exemplary embodiment shown is a certain style of troughing or carry idler, in other embodiments the idler assembly 1100 may comprise a garland, a flat carrier, wire rope, or a variable pitch idler, among others. In various embodiments, the idler roller assembly may comprise one, two, three or more idler rollers which may be arranged in a symmetrical arrangement, in a non-symmetrical arrangement, or in a horizontal or parallel fashion.

Returning to FIGS. 10-13, the conveyor optionally includes a support assembly 1040. The support assembly 1040 optionally includes an undercarriage 1042 coupled (e.g., pivotally coupled) to the conveyor frame 1002 (e.g., to the frame section 1010). The undercarriage 1042 is optionally rollingly supported by a wheel assembly 1045. In some embodiments, the conveyor may be supported and/or moveable on tracks or other structure. A brace 1046 is optionally coupled (e.g., pivotally coupled) at a first end thereof to the undercarriage 1042; the brace 1046 is optionally coupled (e.g., pivotally coupled) at a second end thereof to the conveyor frame 1002 (e.g., to the frame section 1020).

Figure 10:
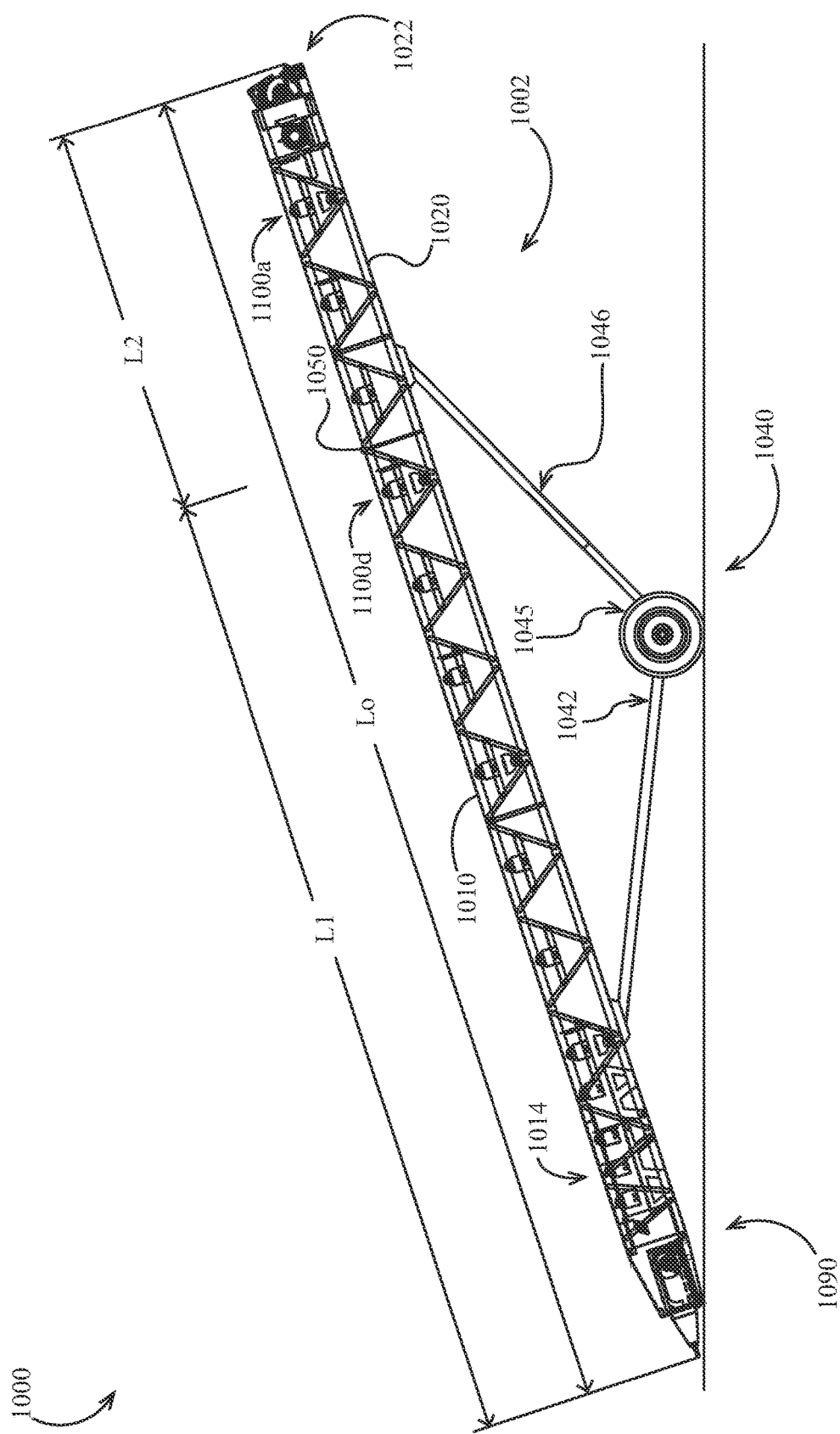
FIG. 10 is a side elevation view of an embodiment of a folding conveyor in an operational configuration.
Figure 12:
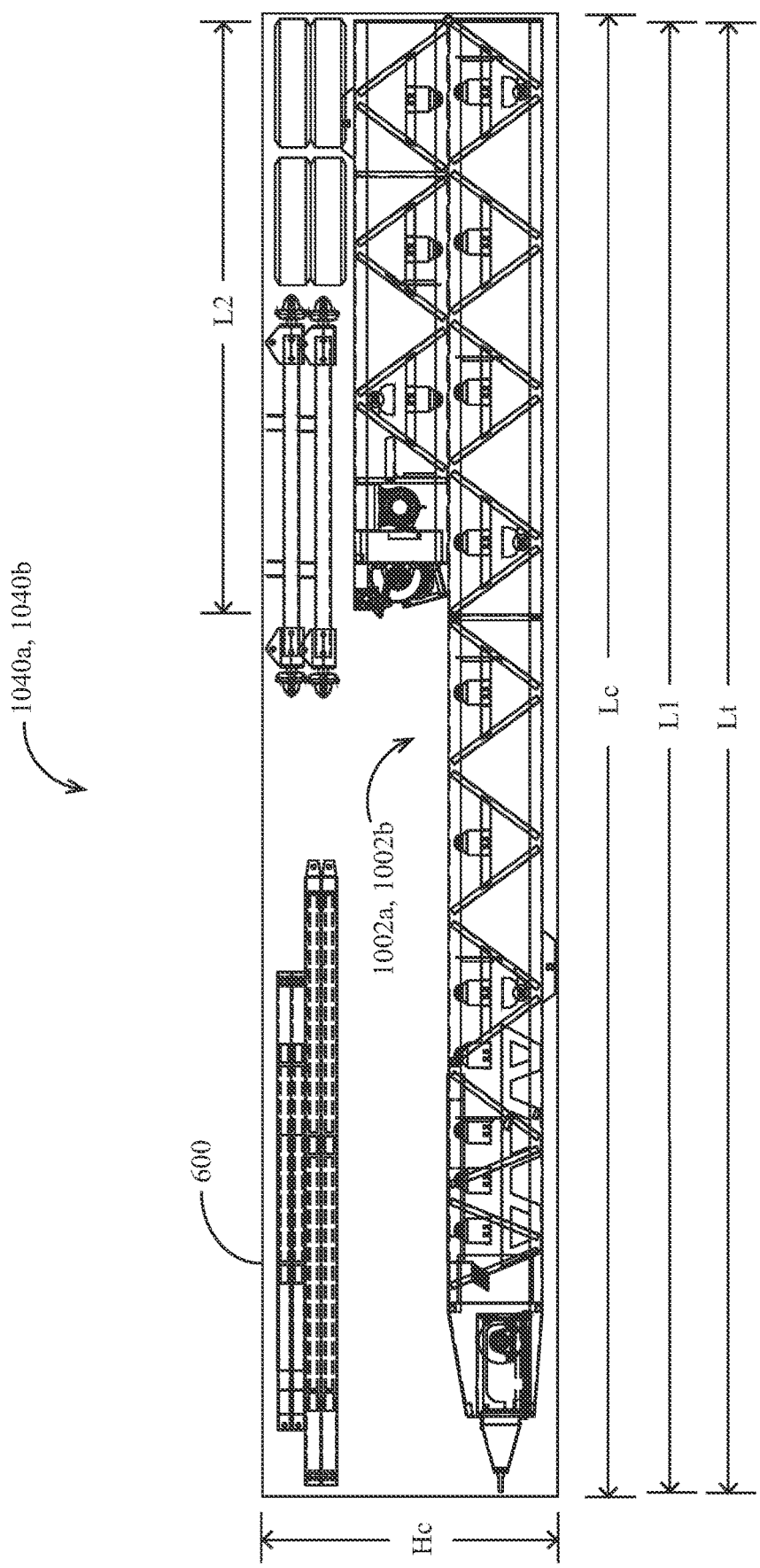
FIG. 12 is a side elevation view of the conveyor of FIG. 10 in a transport configuration stored in a container.

Referring to FIG. 10, an overall length Lo of the conveyor 1000 in the operational configuration may be measured between a rearward end (e.g., towing eye) of the conveyor and a forward end (e.g., head pulley assembly) of the conveyor. The length Lo may comprise the sum of the lengths L1, L2 of the frame sections 1010, 1020, respectively. Referring to FIG. 12, the length L1 of the frame section 1010 is optionally less (e.g., slightly less) than the length Lc (e.g., 40 feet) of container 600 or another container in which the conveyor 1000 is stored. The transport length Lt of the conveyor frame 1002 in the transport configuration is optionally equal to or approximately the same as (e.g., slightly greater than) the length L1 of frame section 1010.

Figure 11:
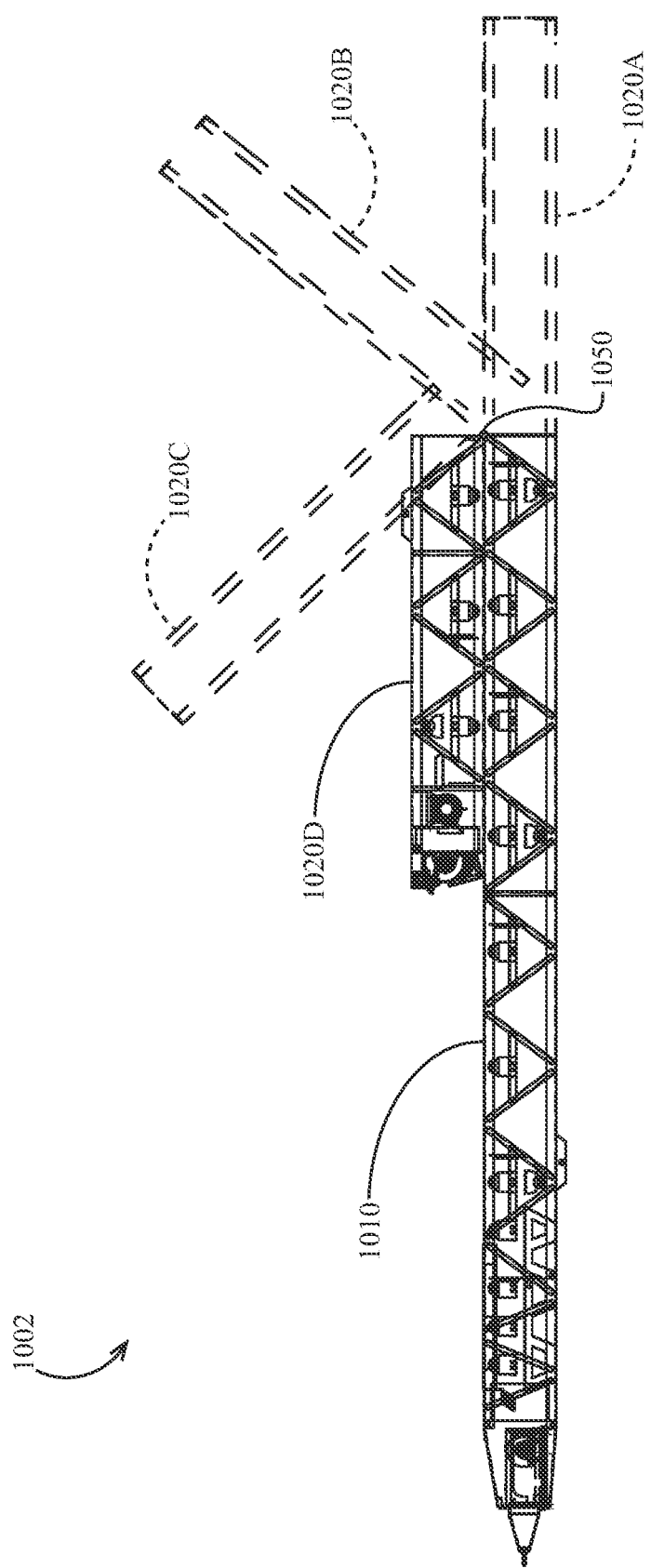
FIG. 11 is a side elevation view of a frame of the conveyor of FIG. 10 in a transport configuration.

Referring to FIG. 11, the conveyor frame 1002 is illustrated in a transport configuration. The conveyor frame 1002 optionally reconfigures into the transport configuration by rotating the frame section 1020 about the hinge 1050 (e.g., pivot assembly) from an operational position 1020A through a plurality of intermediate positions (e.g., 1020B, 1020C) into a transport position 1020D. In the transport position 1020D, the frame section 1020 is optionally parallel with the frame section 1010. In the transport position 1020D, the frame section 1020 optionally rests on top of the frame section 1010 (e.g., at one or more supports or stops along the length of the frame section 1010 or along the length of the frame section 1010). In some embodiments, one or more chords (which in some embodiments described herein may be described as rails) of frame section 1020 rest on top of one or more chords of frame section 1010 In the transport position 1020D, the frame section 1020 is optionally upside-down relative to the operational position 1020A.

Figure 13:
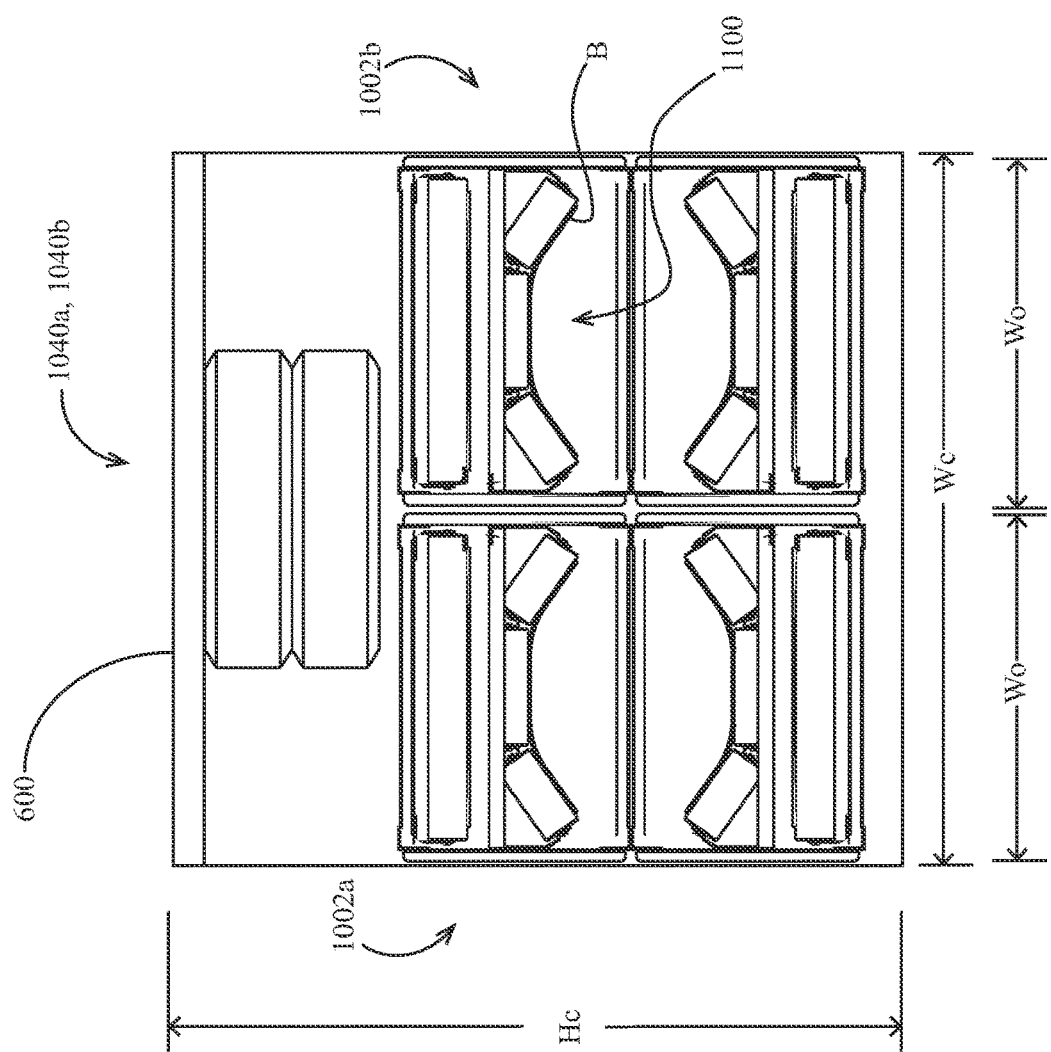
FIG. 13 is a front elevation view of the conveyor of FIG. 10 and another conveyor in a transport configuration stored in a container.

Referring to FIGS. 12 and 13, the conveyor 1000 (e.g., the conveyor frame 1002 in its transport configuration and the support assembly 1040) is shown disassembled and stored in the container 600. In some examples the support assembly 1040 may be disassembled and stored above the conveyor frame 1002. The height of the disassembled conveyor 1000 is optionally less than the height Hc of the container 600.

Two conveyors are optionally stored on the container 600. In some examples, a second conveyor frame 1002b is optionally stored in side-by-side relation with a first frame 1002a. In some examples, the second conveyor frame may have a different length and/or configuration from the first conveyor frame. The sum of the overall widths Wo of the first and second conveyor frames 1002 are optionally less than (e.g., slightly less than) a width Wc of the container (e.g., 7.5 feet). The widths of the first and second conveyor frames may be the same or different according to various embodiments.

Figure 14:
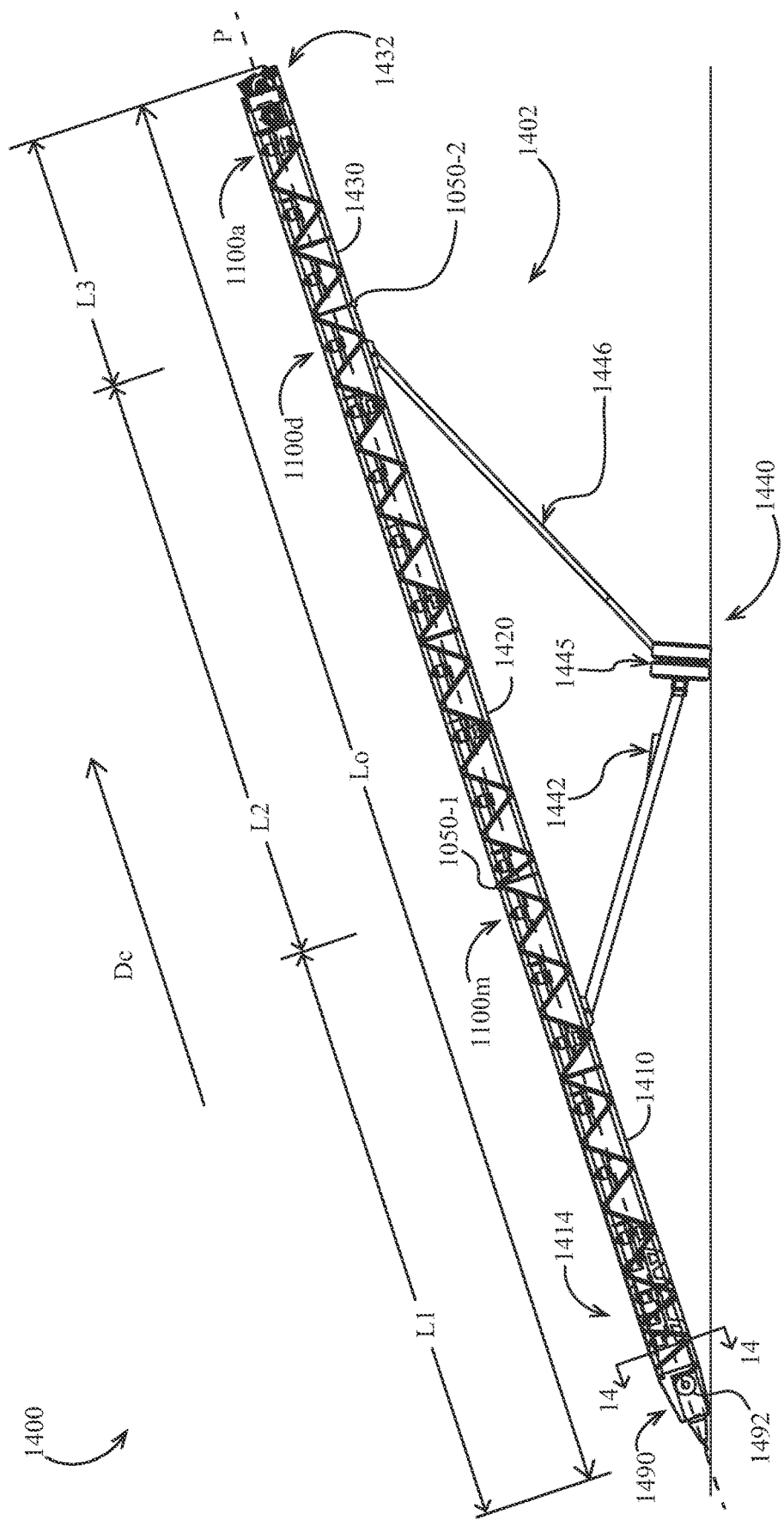
FIG. 14 is a side elevation view of an embodiment of a folding conveyor in an operational configuration.
Figure 15:
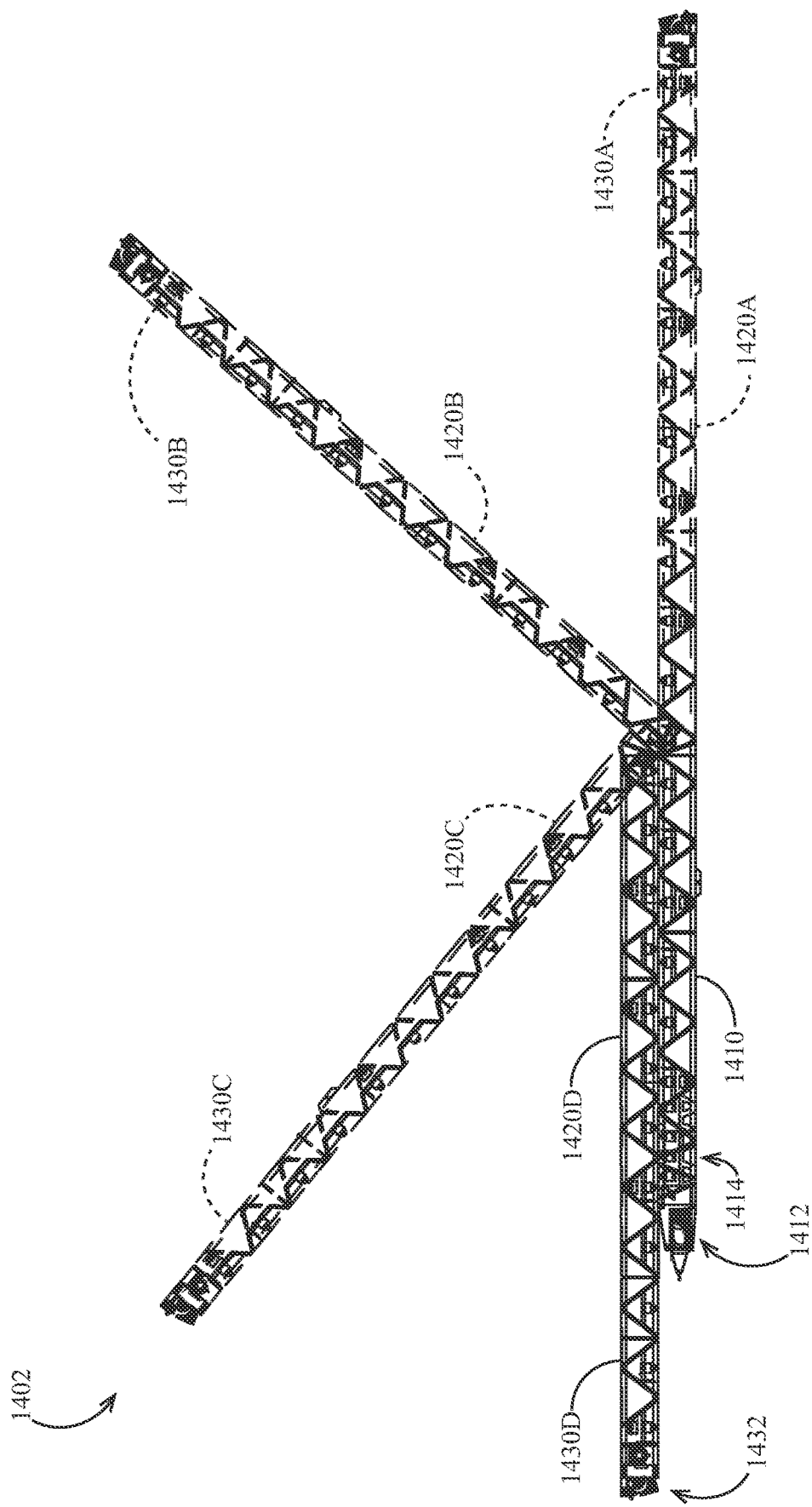
FIG. 15 is a side elevation view of a frame of the conveyor of FIG. 14 in an intermediate configuration.
Figure 16:
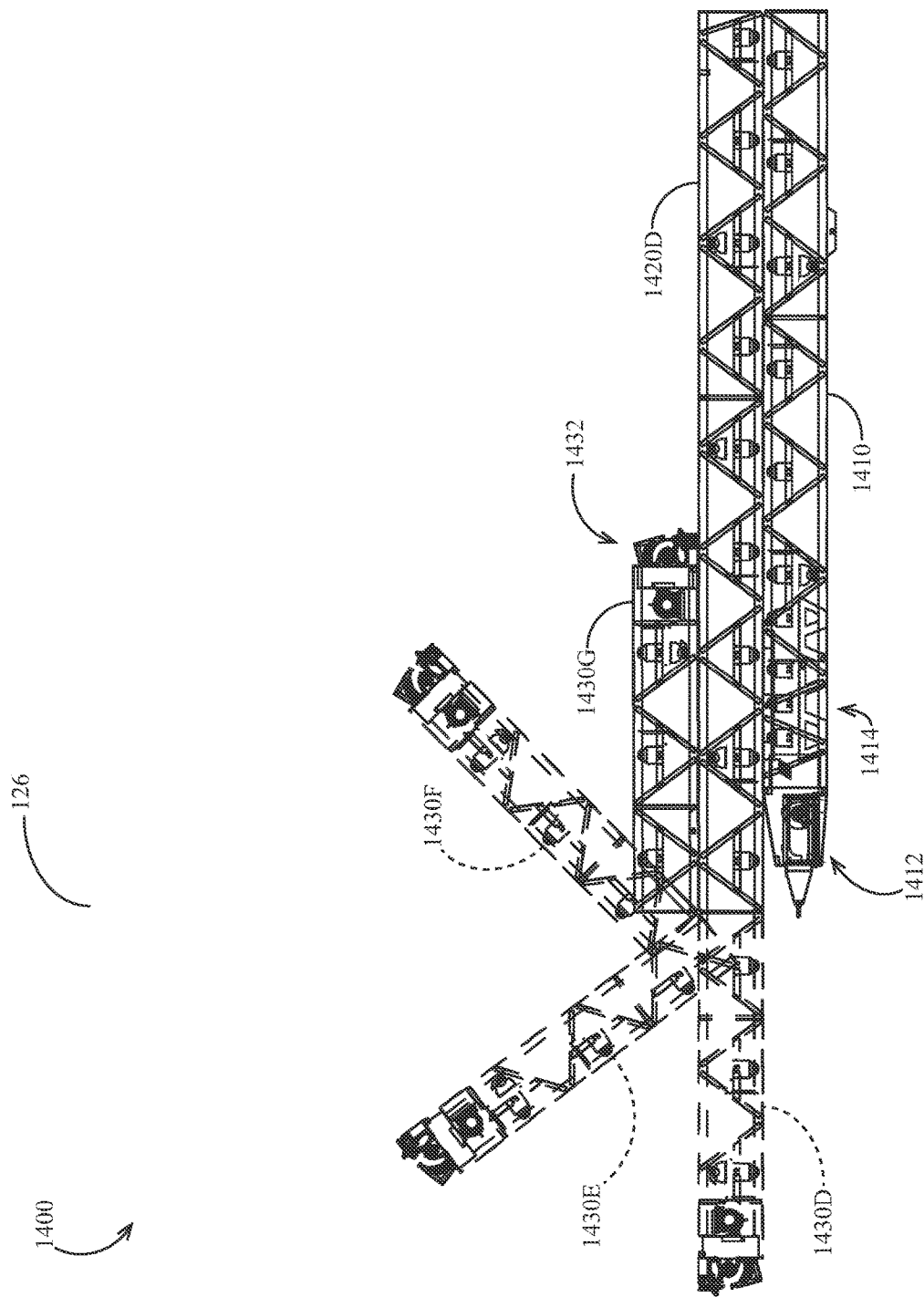
FIG. 16 is a side elevation view of a frame of the conveyor of FIG. 14 in a transport configuration.

Referring to FIGS. 14-16, a conveyor 1400 is illustrated having a conveyor frame 1402 comprising three frame sections 1410, 1420, and 1430.

The frame sections 1410, 1420 optionally fold relative to one another about a hinge 1050-1. The hinge 1050-1 optionally pivotally couples upper portions (e.g., upper structural elements such as upper truss chords) of the frame sections 1410, 1420. The hinge 1050-1 optionally comprises one of the hinge embodiments described herein. The frame section 1410 optionally pivots in a first angular (e.g., pivotal, rotational) direction relative to the frame section 1420 about the hinge 1050-1.

The frame sections 1420, 1430 optionally fold relative to one another about a hinge 1050-2. The hinge 1050-2 optionally pivotally couples lower portions (e.g., lower structural elements such as lower truss chords) of the frame sections 1420, 1430. The hinge 1050-2 optionally comprises one of the hinge embodiments described herein. The frame section 1430 optionally pivots in a second angular direction (e.g., opposite to the first angular direction) relative to the frame section 1420 about the hinge 1050-2.

It should be appreciated that in some implementations, the conveyor belt may be installed on the conveyor prior to folding between the transport and operating configurations. In some such implementations, the belt may be folded at first and second folds in the transport configuration.

In the illustrated embodiment, the hinge 1050-1 is disposed generally at or above an upper end of the conveyor frame and the hinge 1050-2 is disposed generally at or below a lower end of the conveyor frame (e.g., when the conveyor frame is in the operational configuration and oriented horizontally). However, according to various embodiments, the positions of the hinges 1050-1, 1050-2 may be reversed (e.g., the hinge 1050-1 may be disposed at a lower end of the conveyor frame and the hinge 1050-2 may be disposed at an upper end of the conveyor frame).

The frame sections 1410, 1420, 1430 each support a plurality of idler assemblies 1100 (e.g., forwardmost idler assemblies of each frame section 1100m, 1100d, and 1100a) configured to operably support an endless belt B. A subset 1414 of idler assemblies (e.g., in a loading zone near a rearward end of the conveyor) are optionally closer together than the other idler assemblies. The frame section 1410 optionally operably supports a tail pulley assembly 1490. The frame section 1430 optionally operably supports a head pulley assembly 1432. The head and tail pulley assemblies optionally cooperatively operably support the belt B (e.g., an endless belt such as a flexible belt) in operation for conveying materials (e.g., aggregate materials such as rock, stone, sand, gravel, minerals, etc.) along a conveyance direction Dc; in some embodiments the head pulley assembly 1432 is driven by a motor in order to advance the belt B.

The conveyor 1400 optionally includes a support assembly 1440. The support assembly 1440 optionally includes an undercarriage 1442 coupled (e.g., pivotally coupled) to the conveyor frame 1402 (e.g., to the frame section 1410). The undercarriage 1442 is optionally coupled to the conveyor frame 1402 at a position rearward (e.g., along direction Dc) of hinge 1050-1. The undercarriage 1442 is optionally rollingly supported by a wheel assembly 1445. A brace 1446 (e.g., a fixed-length or telescoping brace) is optionally coupled (e.g., pivotally coupled) at a first end thereof to the undercarriage 1442; the brace 1446 is optionally coupled (e.g., pivotally coupled) at a second end thereof to the conveyor frame 1402 (e.g., to the frame section 1020). The brace 1446 is optionally pivotally coupled to the conveyor frame 1402 at a position rearward (e.g., along direction Dc) of hinge 1050-2.

Referring to FIG. 14, a plane P intersects the tail pulley (e.g., a rotational axis thereof) and the head pulley (e.g., a rotational axis thereof). In some embodiments, the plane P extends between the hinges 1050-1, 1050-2. In some embodiments, the hinge 1050-1 is disposed above (e.g., on a first side of) the plane P and the hinge 1050-2 is disposed below (e.g., on a second side of, opposite the first side of) the plane P. In some embodiments, the hinge 1050-1 is disposed below the plane P and the hinge 1050-2 is disposed above the plane P.

Figure 17:
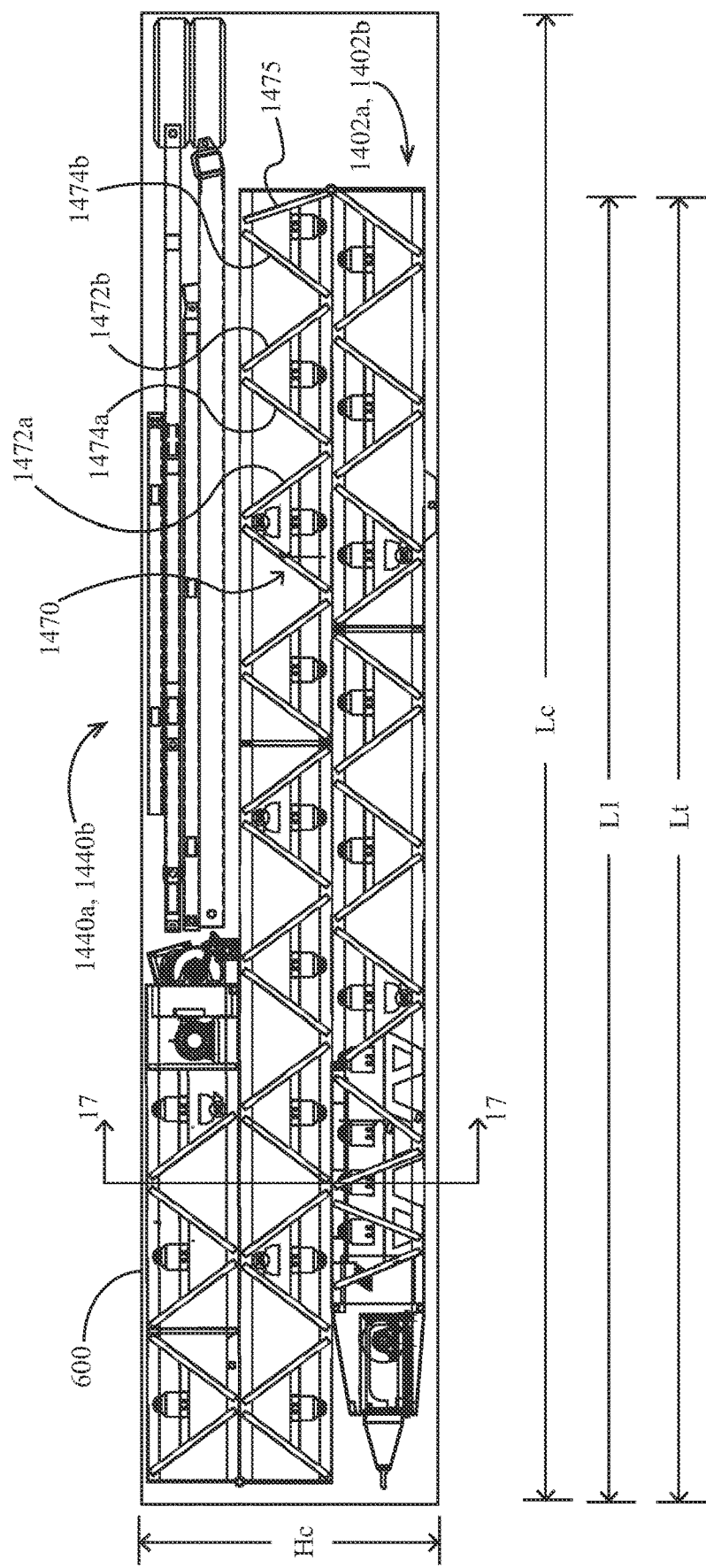
FIG. 17 is a side elevation view of the conveyor of FIG. 14 in a transport configuration stored in a container.

Referring to FIG. 14, an overall length Lo of the conveyor 1400 in the operational configuration may be measured between a rearward end (e.g., towing eye) of the conveyor and a forward end (e.g., head pulley assembly) of the conveyor. The length Lo may comprise the sum of the lengths L1, L2, L3 of the frame sections 1410, 1420, 1430, respectively. Referring to FIG. 17, the length L2 of the frame section 1420 is optionally less (e.g., slightly less) than the length Lc (e.g., 40 feet) of container 600 or another container in which the conveyor 1000 is stored. The transport length Lt of the conveyor frame 1402 in the transport configuration is optionally equal to or approximately the same as (e.g., slightly greater than) the length L1 of frame section 1420.

Referring to FIG. 15, the conveyor frame 1402 is illustrated in an intermediate configuration between the operational configuration and a transport configuration. The conveyor frame 1402 optionally reconfigures into the intermediate configuration by rotating the frame section 1420 about the hinge 1050-1 from an operational position 1420A through a plurality of intermediate positions (e.g., 1420B, 1420C) into an intermediate position 1420D. In the intermediate position 1420D, the frame section 1420 is optionally generally parallel with the frame section 1410. In the intermediate position 1420D, the frame section 1420 optionally rests on top of the frame section 1410 (e.g., at one or more supports or stops and/or along the length of the frame section 1010). In the intermediate position 1420D, the frame section 1420 is optionally upside-down relative to the operational position 1020A. In some implementations, in the intermediate positions 1420B, 1420C, 1420D, the frame section 1430 remains parallel to the frame section 1420 (e.g., in intermediate positions 1430A, 1430B, 1430C, 1430D). In alternative implementations, the frame section 1430 may fold relative to the frame section 1420 while the frame section 1420 folds relative to the frame section 1410.

Referring to FIG. 16, the conveyor frame 1402 is shown in a transport configuration. The conveyor frame 1402 optionally reconfigures into the transport configuration by rotating the frame section 1430 about the hinge 1050-2 from an intermediate position (e.g., 1430D) through a plurality of intermediate positions (e.g., 1420E, 1430F) into a transport position 1430G. In the transport position 1430G, the frame section 1430 optionally rests on top of the frame section 1420 (e.g., at one or more supports or stops and/or along the length of the frame section 1420). In some embodiments, one or more chords of the frame section 1430 rest directly on one or more chords of the frame section 1420. In the transport position 1430G, the frame section 1430 is optionally in the same orientation as (e.g., parallel to) the operational position 1430A.

Referring to FIG. 17, the conveyor 1400 (e.g., the conveyor frame 1402 in its transport configuration and the support assembly 1440) is shown disassembled and stored in the container 600. In some examples the support assembly 1040 may be disassembled and stored above the conveyor frame 1402. The height of the conveyor frame 1402 in the transport configuration (e.g., the some of the heights of the frame sections 1410, 1420, 1430) is optionally less than the height Hc of the container 600.

Figure 18:
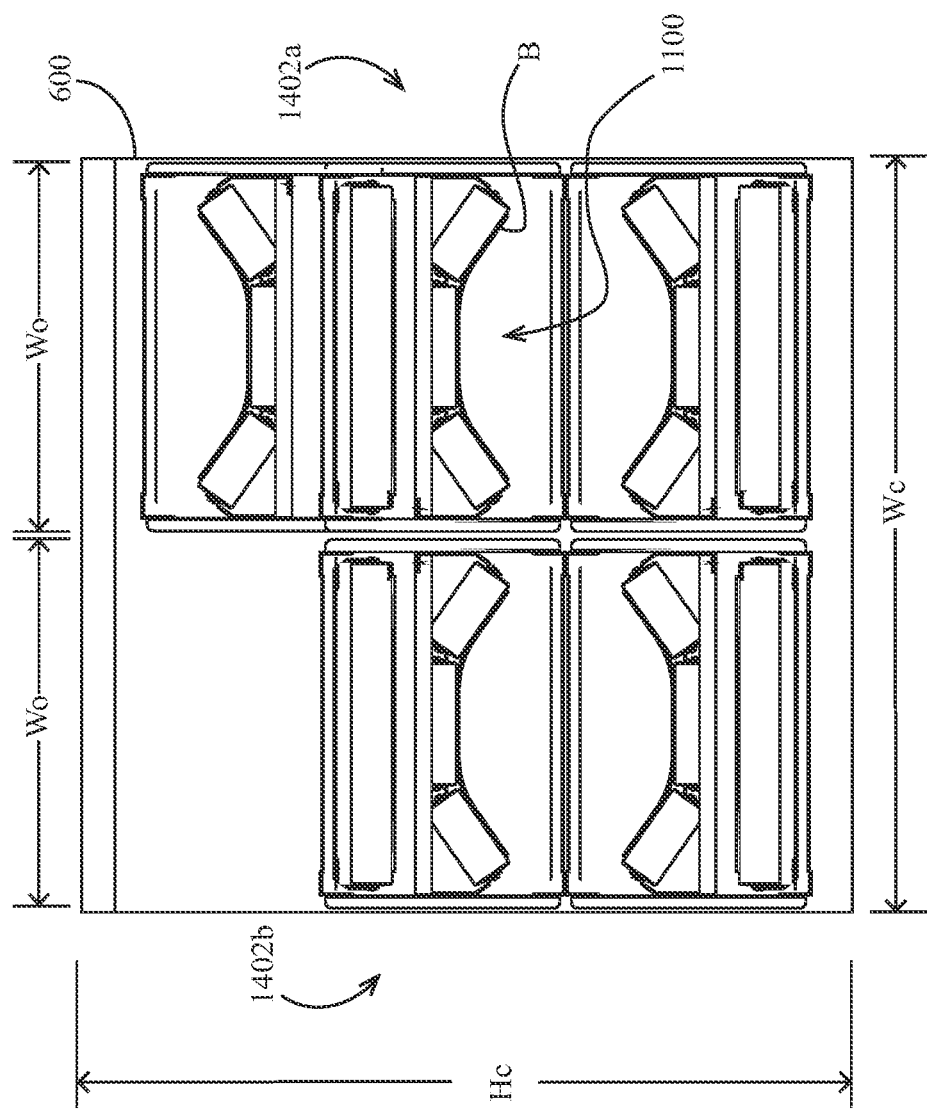
FIG. 18 is a sectional view along section 17-17 of FIG. 17 showing the conveyor of FIG. 14 and another conveyor in a transport configuration stored in a container.

Referring to FIG. 18, two conveyors are optionally stored on the container 600. In some examples, a second conveyor frame 1402b is optionally stored in side-by-side relation with a first frame 1002a. In some examples, the second conveyor frame may have a different length and/or configuration from the first conveyor frame. In some examples, a motor driving the head pulley on the frame section 1430 of a first conveyor extends above a frame section of the second conveyor when both conveyors are loaded on the container. In some examples, the first and second conveyors are oriented in opposite directions when loaded on the conveyor (e.g., with the head pulley assembly of the two conveyors pointing in opposite directions). The sum of the overall widths Wo of the first and second conveyor frames 1402 are optionally less than (e.g., slightly less than) a width We of the container (e.g., 7.5 feet). The widths of the first and second conveyor frames may be the same or different according to various embodiments.

Referring to FIG. 19, the frame section 1430 is illustrated having truss chords 1438 extending substantially along the length of the frame section (e.g., upper left chord 1438-1a, upper right cord 1438-2a, lower left chord 1438-1b, and lower right chord 1438-2b). One or more cross braces 1436 are optionally mounted at a left end thereof to a left chord 1438-1 and is optionally mounted at a right end thereof to a right chord 1438-2.

Turning to FIG. 17, a plurality of struts is optionally disposed on each transverse side of each of the frame sections (e.g., the struts may be mounted to the chords of each frame section). A first subset of struts 1472 are optionally generally parallel with one another. A second subset of struts 1474 are optionally generally parallel with one another. One or more struts 1475 are optionally not parallel to either subset of struts 1472, 1474. The strut 1475 may be disposed adjacent to a hinge 1450 between frame sections; in other embodiments, the strut 1475 is disposed remote from a hinge.

Returning to FIG. 19, each strut 1472 is optionally mounted an upper chord at an upper portion thereof and to a lower chord at a lower portion thereof. One or more struts 1472 is optionally mounted outboard of (e.g., farther from a central longitudinal plane of belt B along a horizontal direction than) one or more chords to which the strut is mounted. For example, strut 1472-1 is optionally mounted outboard of (e.g., on a left side of) chords 1438-1a and/or 1438-1b. For another example, strut 1472 is optionally mounted outboard of (e.g., on a right side of) chords 1438-1b and/or 1438-2b. Each strut 1472 is optionally mounted to an outboard-facing face of one or more chords 1438. In some alternative embodiments, one or more struts may be mounted inboard of the chords to which they are mounted (e.g., for ease of manufacture and/or to reduce exposure of the struts to contact with foreign objects). A lateral clearance Lc between inboard surface of the strut and the belt (and/or outboard end of the outer conveyor roller) is optionally greater for a given overall width of the conveyor truss in some embodiments in which the struts are mounted outboard of the chords than in embodiments in which the struts are mounted inboard of the chords.

In the embodiment illustrated in FIG. 19, the idler assembly 1100 is optionally contained within the envelope (e.g., bounding volume) of the frame section. In other embodiments, the idler assembly 1100 may extend out of the envelope of the frame section (e.g., the idler assembly 1100 may extend upward through a plane defined by the upper ends (e.g., chords) of the frame section. In such embodiments, the idler assemblies 1100 are optionally positioned such that the idler assemblies of one frame section (e.g., the first frame section) do not interfere with (e.g., contact) idler assemblies of a second frame section (e.g., the second frame section) when the conveyor is folded in the transport configuration.

In some embodiments, one or more chords 1438 are disposed between a strut 1472 mounted to the chord 1438 and the side of belt B disposed closest to the strut 1472 mounted to the chord 1438.

In some embodiments, one or more outboard ends (e.g., left and/or right ends such as outer perch supports 1160) of one or more idler assemblies 1100 are disposed vertically between an upper chord 1438 (e.g., and outboard end thereof) and a lower chord 1438 (e.g., an outboard end thereof). In some embodiments, one or more outboard ends of idler assemblies 1100 intersect (or are disposed adjacent to) a plane defined by outboard ends (e.g., outboard surfaces) of a pair of chords 1438.

The other frame sections 1410 and 1420 optionally have common features and/or characteristics with the frame section 1430 described above. For example, the struts of frame sections 1410, 1420 may be disposed generally outboard of the chords thereof.

Figure 20:
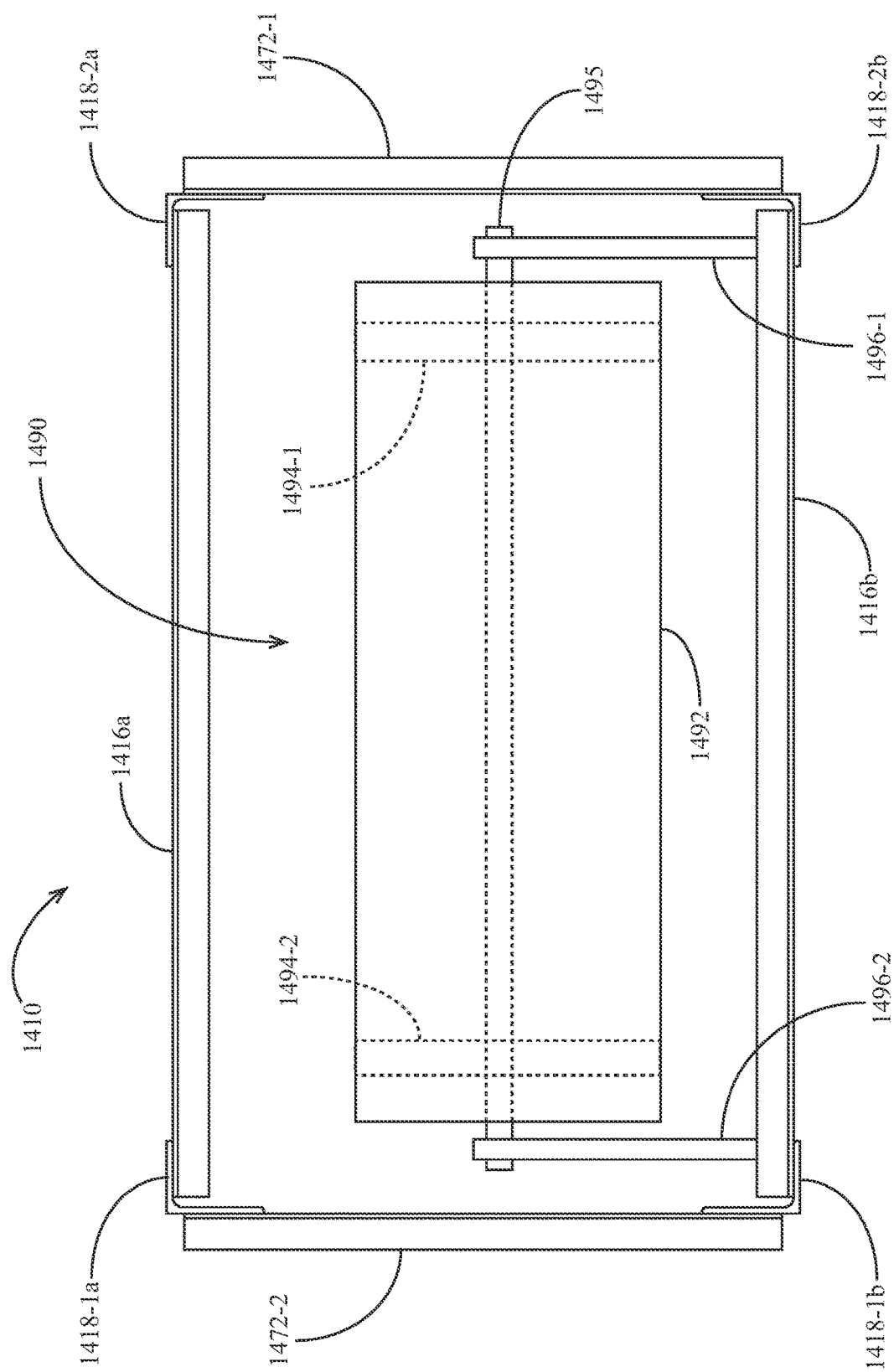
FIG. 20 is a view along section 14-14 of FIG. 14 showing an embodiment of a tail pulley assembly.

Referring to FIG. 20, an exemplary embodiment of the tail pulley assembly 1490 is illustrated supported on the frame section 1410. The tail pulley assembly 1490 optionally comprises a dead shaft pulley (e.g., in which the shaft is stationary in operation) as illustrated; in other embodiments, the tail pulley assembly may comprise a different style of pulley (e.g., in which the shaft rotates in operation). In some embodiments, the tail pulley assembly 1490 may comprise and/or have one or more common features with one or more pulley embodiments described in U.S. Pat. No. 5,897,214, incorporated herein by reference. The tail pulley assembly 1490 optionally comprises a shaft 1495 supported (e.g., in a stationary manner) on one or more supports 1496. The supports 1496 may be mounted to and/or supported on a cross brace 1416 (e.g., upper and/or lower cross brace) of the frame section 1410. The cross brace 1416 is optionally mounted to and/or supported on chords 1418-1, 1418-2. The chords 1418 are illustrated in FIG. 20 angles; in other embodiments, the chords may comprise beams, channel beams, channels, partial beams, or other structure including other chord embodiments described herein. Struts 1472 are optionally mounted outboard of chords 1418. The tail pulley assembly 1490 optionally comprises a pulley 1492 having left and right bearing assemblies 1494-1, 1494-2, respectively, rollingly supported on the shaft 1495. In some embodiments, each bearing assembly 1494 is optionally disposed inboard of the outboard end of pulley 1492 closest to (e.g., adjacent to) the bearing assembly 1494.

Figure 22:
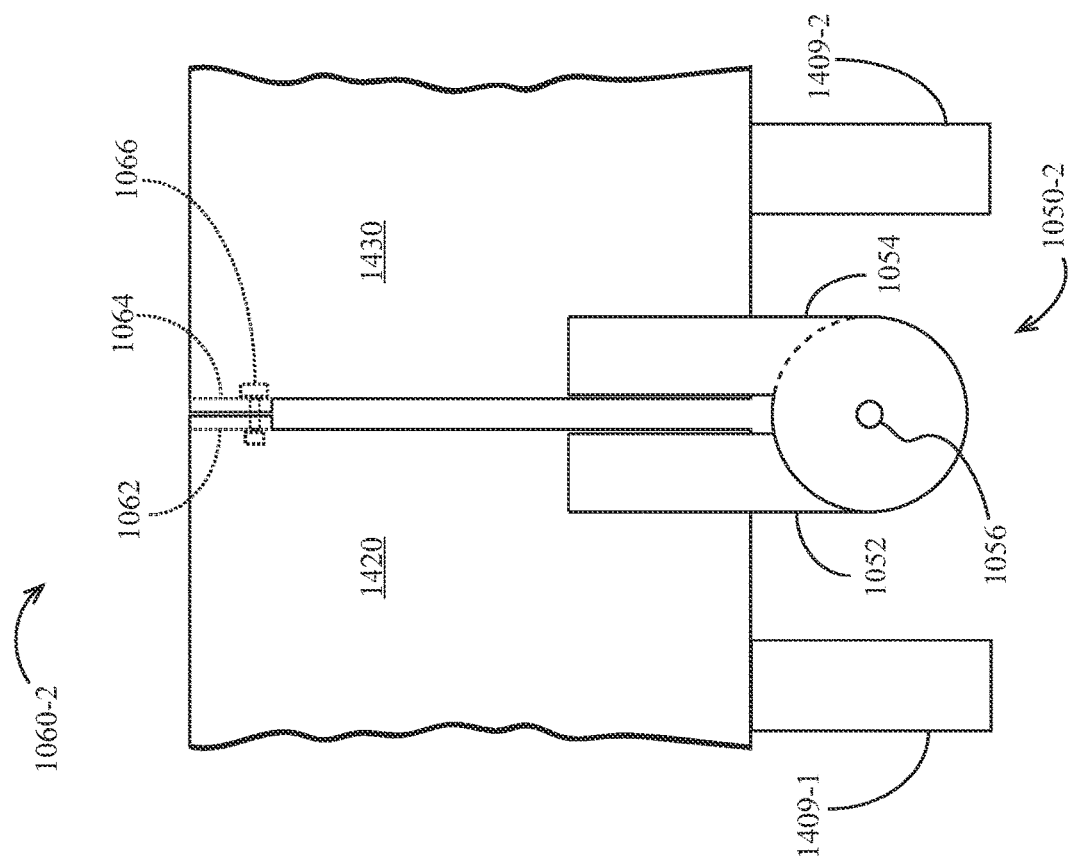
FIG. 22 is a side elevation view of an embodiment of a hinge on an embodiment of a conveyor truss.
Figure 21:
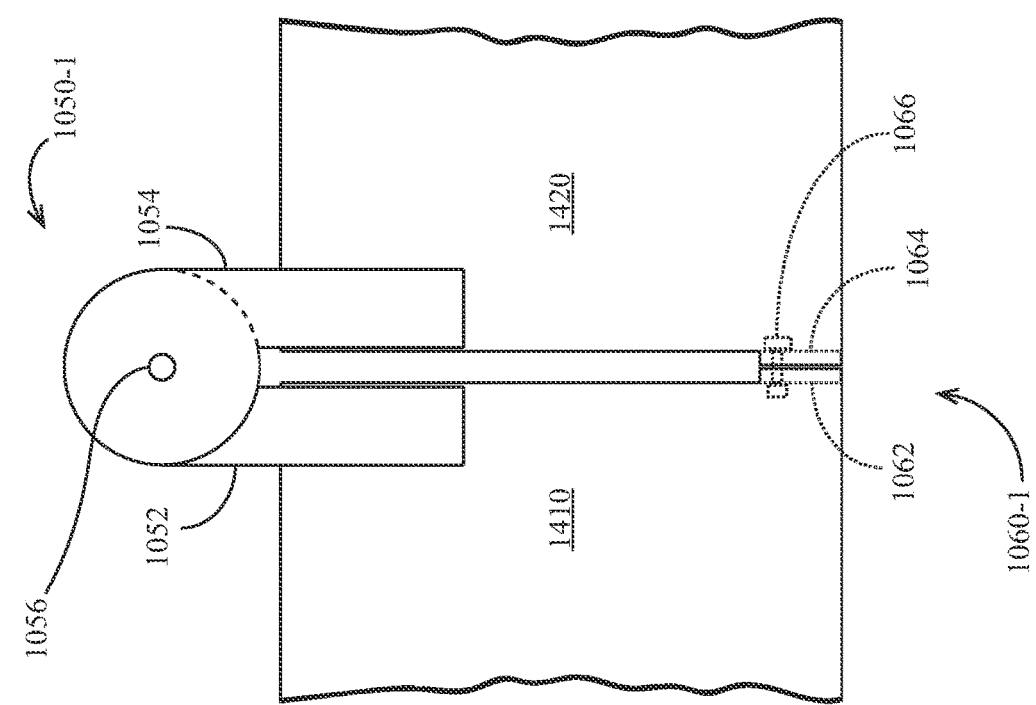
FIG. 21 is a side elevation view of an embodiment of a hinge on an embodiment of a conveyor truss.

Referring to FIGS. 21 and 22, the hinges 1050-1, 1050-2 (e.g., pivot assemblies) are illustrated in more detail according to some embodiments.

Referring to FIG. 21, the hinge 1050-1 optionally includes a first hinge arm 1052 mounted to the first frame section 1410 (e.g., to an upper end thereof, an upper truss chord thereof, etc.) and extending upward from the first frame section. The hinge 1050-1 optionally includes a second hinge arm 1054 mounted to the second frame section 1420 (e.g., to an upper end thereof, an upper truss chord thereof, etc.) and extending upward from the second frame section. A pivot 1056 (e.g., pin, rod or other structure) optionally pivotally couples the first hinge arm 1052 to the second hinge arm 1054. The pivot 1056 of hinge 1050-1 is optionally disposed generally at an upper end of (e.g., at least partially above) the conveyor frame 1402 when the conveyor truss is in a horizontally extending orientation and has not been folded for transport. In some embodiments, a first hinge 1050-1a is mounted to on a first transverse side (e.g., right side) of the conveyor frame 1402 and a second hinge 1050-1b is mounted on a second transverse side (e.g., left side) of the conveyor frame 1402; in such embodiments, the first and second hinges may be either joined by a common pivot 1056 or may have separate co-axial pivots.

Referring to FIG. 21, the hinge 1050-2 optionally includes a first hinge arm 1052 mounted to the second frame section 1420 (e.g., to a lower end thereof, a lower truss chord thereof, etc.) and extending downward from the second frame section. The hinge 1050-2 optionally includes a second hinge arm 1054 mounted to the third frame section 1430 (e.g., to a lower end thereof, a lower truss chord thereof, etc.) and extending downward from the third frame section. A pivot 1056 (e.g., pin, rod or other structure) optionally pivotally couples the first hinge arm 1052 to the second hinge arm 1054. The pivot 1056 of hinge 1050-2 is optionally disposed generally at a lower end of (e.g., at least partially below) the conveyor frame 1402 when the conveyor truss is in a horizontally extending orientation and has not been folded for transport. In some embodiments, the conveyor frame 1402 optionally includes downwardly extending structure (e.g., one or more stops 1409 mounted to the conveyor truss) which optionally prevents the hinge 1050-2 from contacting the ground when the conveyor truss is rested on the ground before being folded for transport; in other examples, the hinge may be positioned such that the truss chords protect the hinge from contacting the ground, or alternatively structure other than the truss chords may be used to protect the hinge from contacting the ground. In some embodiments, a first hinge 1050-2a is mounted to on a first transverse side (e.g., right side) of the conveyor frame 1402 and a second hinge 1050-2b is mounted on a second transverse side (e.g., left side) of the conveyor frame 1402; in such embodiments, the first and second hinges may be either joined by a common pivot 1056 or may have separate co-axial pivots.

Referring to FIGS. 21 and 22, the first and second frame sections 1410, 1420 are optionally selectively retained in position relative to one another (e.g., in the operational configuration) at one or more connections 1060-1. The second and third frame sections 1040-2, 1040-3 are optionally selectively retained in position relative to one another (e.g., in the operational configuration) at one or more connections 1060-2.

Each connection 1060 optionally includes a fastener 1066 (e.g., a removable fastener such as a nut-and-bolt assembly or a pin). The fastener 1066 optionally selectively rigidly couples a first portion 1062 (e.g., plate, tab, lip, or other structure) of one frame section to a second portion 1064 (e.g., plate, tab, lip, or other structure) of another frame section. The first and second portions 1062, 1064 are optionally disposed generally inboard of the outboard surfaces (e.g., struts 1472) of the conveyor frame 1402 and are optionally oriented in a generally inboard direction (e.g., toward a central longitudinal plane of the conveyor 1400). It should be appreciated that one or more of the connections 1060 may be disengaged (e.g., the fastener may be removed and/or disconnected) in order to reconfigure the frame from the operational configuration into the transport configuration. It should be appreciated that one or more of the connections 1060 may be engaged (e.g., the fastener may be installed and/or connected) after reconfiguring the frame from the transport configuration into the operational configuration.

Figure 24:
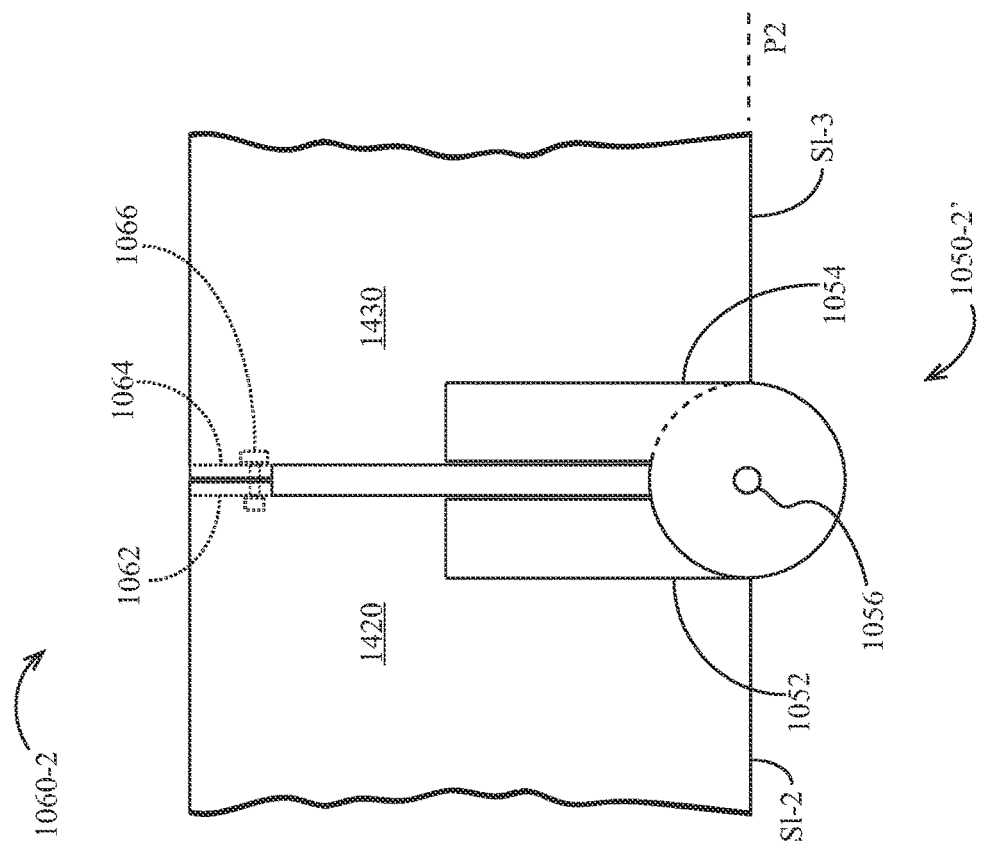
FIG. 24 is a side elevation view of an embodiment of a pivot assembly on an embodiment of a conveyor truss.
Figure 23:
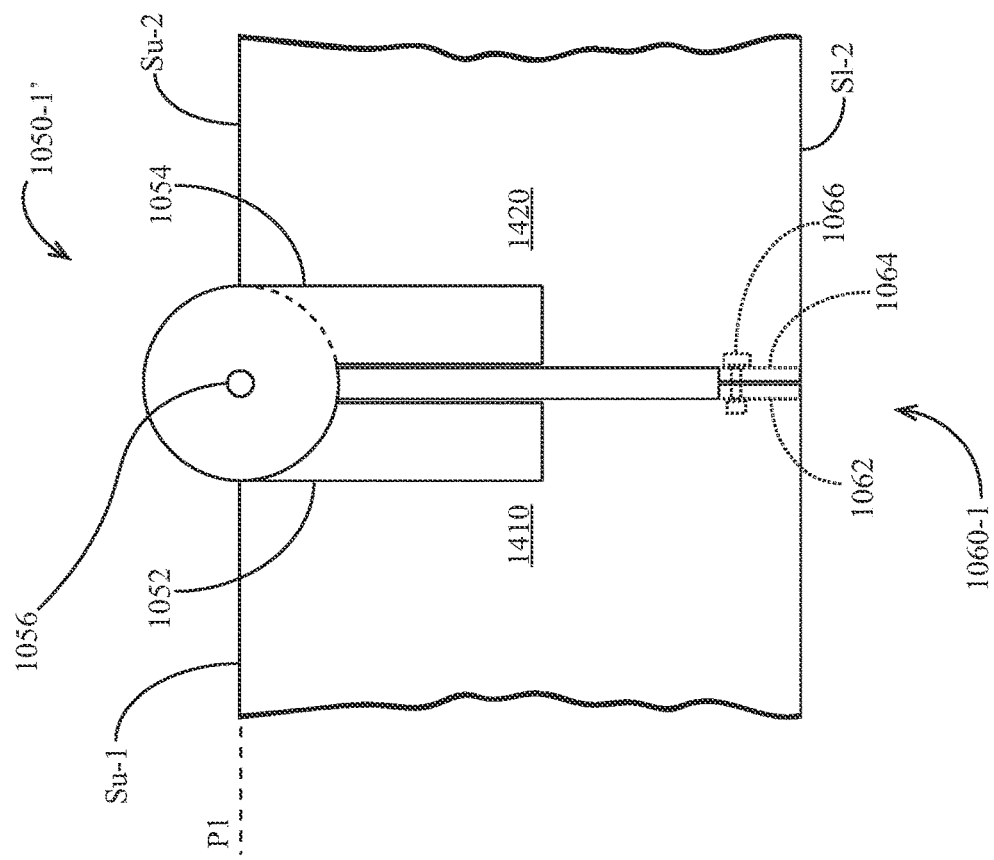
FIG. 23 is a side elevation view of an embodiment of a pivot assembly on an embodiment of a conveyor truss.

Referring to FIGS. 23 and 24, another conveyor embodiment is illustrated having one or more hinges 1050-1', 1050-2' (e.g., pivot assemblies). The hinges 1050-1', 1050-2' are generally similar to the hinges 1050-1, 1050-2 illustrated in FIGS. 21 and 22 except that the pivot 1056 is aligned with a plane defined by surfaces and/or chords of the frame sections joined by the pivot when the truss is in the operational configuration. For example, in some embodiments in the operational configuration a plane P1 intersecting (and/or parallel to) an upper surface of sections 1410 and 1420 also intersects the pivot 1056 of hinge 1050-1'. In some embodiments in the operational configuration a plane P2 intersecting (and/or parallel to) a lower surface of sections 1420 and 1430 also intersects the pivot 1056 of hinge 1050-2'.

In some embodiments, section 1420 pivots about the pivot 1056 of hinge 1050-1' (e.g., a pivot axis defined by the pivot) relative to section 1410 in a first rotational direction. In some embodiments, section 1420 rests directly (or in some embodiments indirectly) on section 1410 in the transport configuration. In some embodiments, a first side (e.g., upper side) of the conveyor truss in the operational configuration comprises first (e.g., upper) surfaces Su-1, Su-2 respectively of the sections 1410, 1420. Surfaces Su-1, Su-2 optionally contact one another in the transport configuration.

In some embodiments, section 1430 pivots about the pivot 1056 of hinge 1050-2' (e.g., a pivot axis defined by the pivot) relative to section 1420 in a second rotational direction (e.g., opposite to the first rotational direction). In some embodiments, section 1430 rests directly (or in some embodiments indirectly) on section 1420 in the transport configuration. In some embodiments, a second side (e.g., lower side) of the conveyor truss in the operational configuration comprises second (e.g., lower) surfaces Sl-2, Sl-3 respectively of the sections 1420, 1430. Surfaces Sl-2, Sl-3 optionally contact one another in the transport configuration.

Referring to FIG. 27, in embodiments such as upper hinge 1050-1", the pivot axis and/or pivot 1056 is optionally level with and/or above upper rails 2518a, 2528a of the frame sections 1410, 1420, respectively and the pivot assembly (e.g., one or more pivot plates thereof) is optionally mounted to and/or supported on lower rails 2518b, 2528b.

Referring to FIG. 28, in embodiments such as lower hinge 1050-2", the pivot axis and/or pivot 1056 is optionally level with and/or above upper rails 2528a, 2538a of the frame sections 1420, 1430, respectively and the pivot assembly (e.g., one or more pivot plates thereof) is optionally mounted to and/or supported on lower rails 2528b, 2538b.

In some embodiments, adjacent frame sections are optionally selectively rigidly coupled in the transport configuration (e.g., by coupling two portions of the frame sections by a removable fastener such as a pin or bolt).

Figure 25:
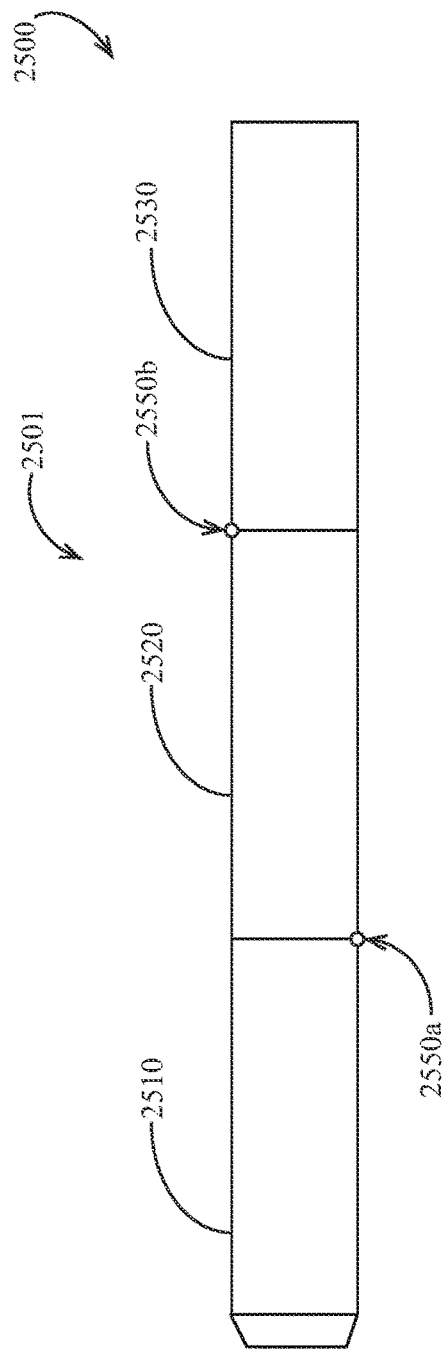
FIG. 25 is a plan view of an embodiment of a conveyor in an operational configuration.
Figure 26:
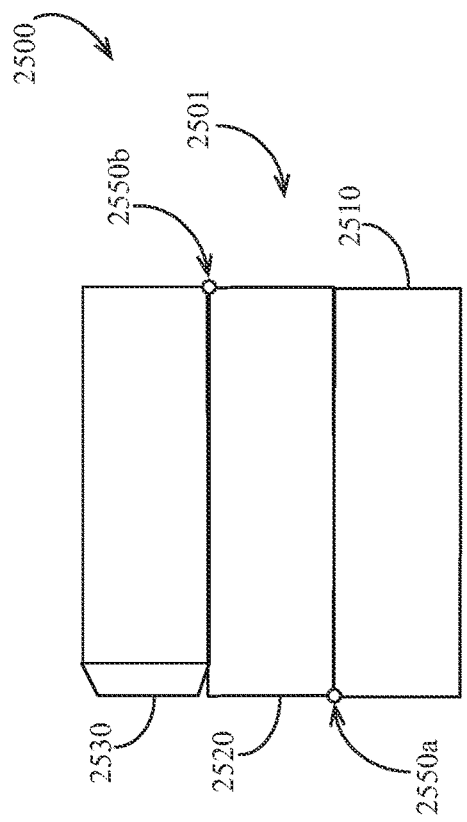
FIG. 26 is a plan view of the conveyor of FIG. 25 in a transport configuration.
Figure 29:
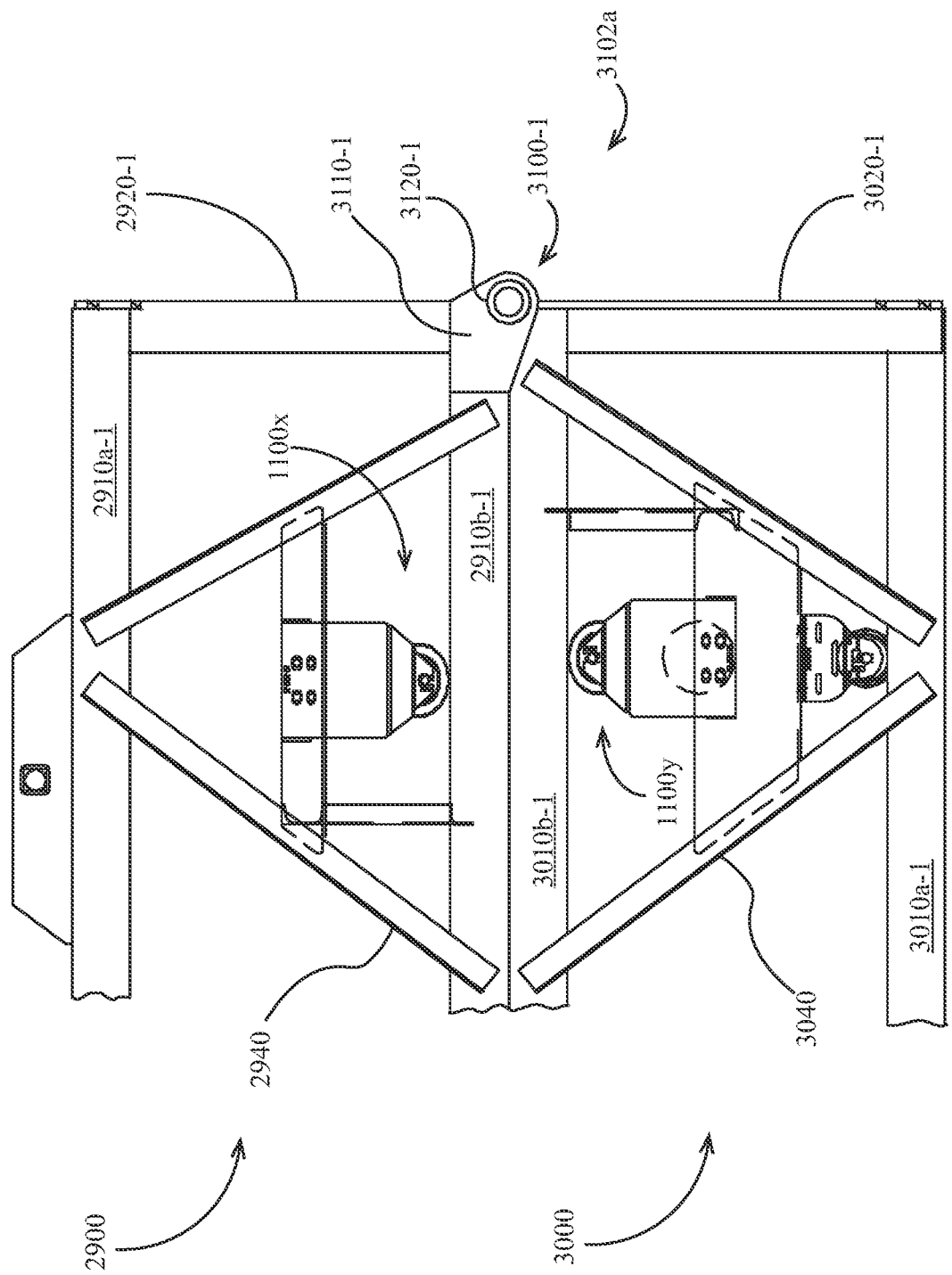
FIG. 29 is a partial side elevation view of an embodiment of a first pivot assembly on an embodiment of a conveyor truss in a transport configuration.

In various alternative embodiments, the hinges between one or more pairs of frame sections may be disposed on the sides of the frame sections such that the frame sections fold into side-by-side relation for transport. For example, in the embodiment shown in FIGS. 25 and 26, a conveyor 2500 includes a conveyor frame 2501 having three sections 2510, 2520, and 2530. The Pivotal connections 2550 (e.g., hinges) are optionally provided on the sides of the frame 2501 such that the frame sections are enabled to pivot into the transport configuration shown in FIG. 26. For example, a first pivotal connection 2550a optionally pivotally couples the left sides of the frame sections 2510 and 2520 (e.g., left chords thereof); a second pivotal connection 2550b optionally pivotally couples the right sides of the frame sections 2520 and 2530 (e.g., right thereof). In some embodiments, a plurality of conveyors 2500 (e.g., 2) may be stacked vertically inside of a container (e.g., standard shipping container, sea container, etc.).

Figure 32:
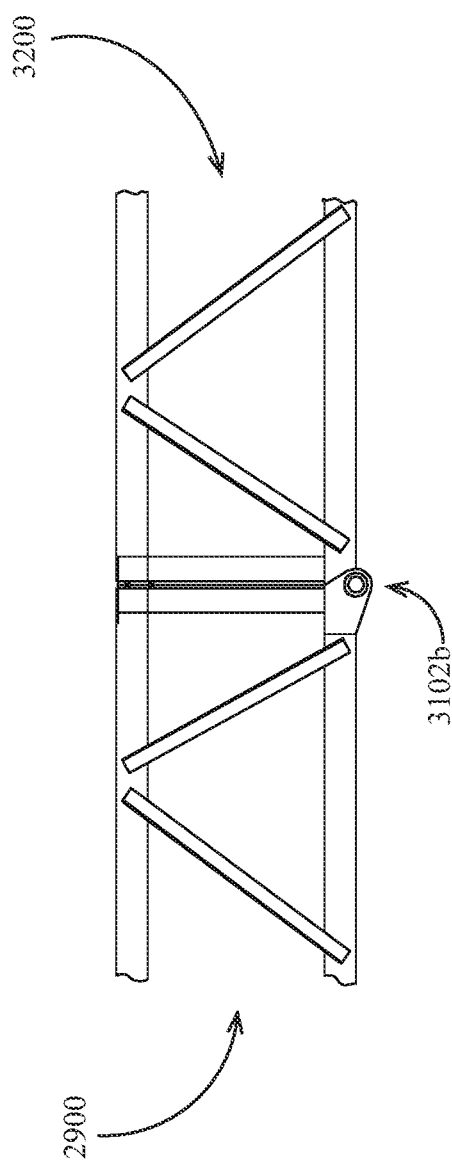
FIG. 32 is a partial side elevation view of an embodiment of a second pivot assembly on the first conveyor truss of FIG. 29 in an operational configuration.

Referring to FIGS. 29 through 32, conveyor truss embodiment is illustrated optionally having a first frame section 3000 pivotally coupled to a second frame section 2900 by a first pivot assembly 3102a. Referring to FIG. 32, the second frame section 2900 is also optionally pivotally coupled to a third frame section 3200 by a second pivot assembly 3102b which is optionally disposed on a generally opposing side of the conveyor from the first pivot assembly 3102a. The second pivot assembly 3102b is optionally otherwise generally similar to (e.g., optionally has common features with) the first pivot assembly 3102a. The third frame section 3200 is optionally generally similar to (e.g., optionally has common features with) the second frame section 2900 and/or the first frame section 3000.

The first frame section 3000 optionally comprises a plurality of longitudinally extending truss chords, e.g., first upper chord 3010b-1, second upper chord 3010b-2, first lower chord 3010a-1, and second chord 3010a-2 (the terms upper and lower as applied to the chords of the embodiment shown in FIGS. 29-32 may refer to the relative orientation in the operational configuration). A plurality of angled struts 3040 are optionally mounted to the upper and lower chords and optionally disposed outboard of the chords. A first end strut 3020-1 (e.g., vertical strut, vertical strut plate, etc.) is optionally mounted to a longitudinal end of the first upper chord 3010b-1 and is optionally mounted to a longitudinal end of the first lower chord 3010a-1. A second end strut 3020-2 is optionally mounted to a longitudinal end of the second upper chord 3010b-2 and is optionally mounted to a longitudinal end of the second lower chord 3010a-2. A first mounting plate 3025-1 (e.g., transversely extending mounting plate) is optionally mounted to and/or formed as a part with the first end strut 3020-1 (e.g., at a lower end thereof or elsewhere along the length of the end strut). A second mounting plate 3025-2 (e.g., transversely extending mounting plate) is optionally mounted to and/or formed as a part with the second end strut 3020-2 (e.g., at a lower end thereof or elsewhere along the length of the end strut). A plurality of idler assemblies (e.g., idler assembly 1100y) are supported in longitudinally spaced relation along the frame section 3000 to operably support the belt B. One or more return rollers 3050 are optionally supported on the sides (e.g., chords) of the frame section 3000 and disposed adjacent a returning portion of the belt B.

The second frame section 2900 optionally comprises a plurality of longitudinally extending truss chords, e.g., first upper chord 2910b-1, second upper chord 2910b-2, first lower chord 2910a-1, and second chord 2910a-2 (the terms upper and lower as applied to the chords of the embodiment shown in FIGS. 29-32 may refer to the relative orientation in the operational configuration). A plurality of angled struts 2940 are optionally mounted to the upper and lower chords and optionally disposed outboard of the chords. A first end strut 2920-1 (e.g., vertical strut, vertical strut plate, etc.) is optionally mounted to a longitudinal end of the first upper chord 2910b-1 and is optionally mounted to a longitudinal end of the first lower chord 2910a-1. A second end strut 2920-2 is optionally mounted to a longitudinal end of the second upper chord 2910b-2 and is optionally mounted to a longitudinal end of the second lower chord 2910a-2. A first mounting plate 2925-1 (e.g., transversely extending mounting plate) is optionally mounted to and/or formed as a part with the second end strut 2920-1 (e.g., at a lower end thereof or elsewhere along the length of the end strut). A second mounting plate 2925-2 (e.g., transversely extending mounting plate) is optionally mounted to and/or formed as a part with the second end strut 2920-2 (e.g., at a lower end thereof or elsewhere along the length of the end strut). A plurality of idler assemblies (e.g., idler assembly 1100x) are supported in longitudinally spaced relation along the frame section 2900 to operably support the belt B. One or more return rollers 2950 are optionally supported on the sides (e.g., chords) of the frame section 2900 and disposed adjacent a returning portion of the belt B.

Each pivot assembly 3102 optionally comprises a first hinge 3100-1 and a second hinge 3100-2. The first and second hinges are optionally disposed on opposing lateral sides of the conveyor. The hinges are optionally disposed at least partially inboard of the end struts.

Each hinge 3100 optionally comprises at least one plate 3110 which is optionally mounted to an upper truss chord 2910b. Each hinge 3100 optionally comprises a pivot 3120 (e.g., tube, rod or pin) which is optionally mounted to an upper truss chord 3010b. The pivot 3120 optionally extends generally transversely. The plate 3110 optionally includes an opening (e.g., circular hole) through which the pivot 3120 extends such that the plate is pivotally coupled to the pivot. In alternative embodiments, the plate may be mounted to chord 3010b and the pivot may be mounted to chord 2910b.

Figure 30:
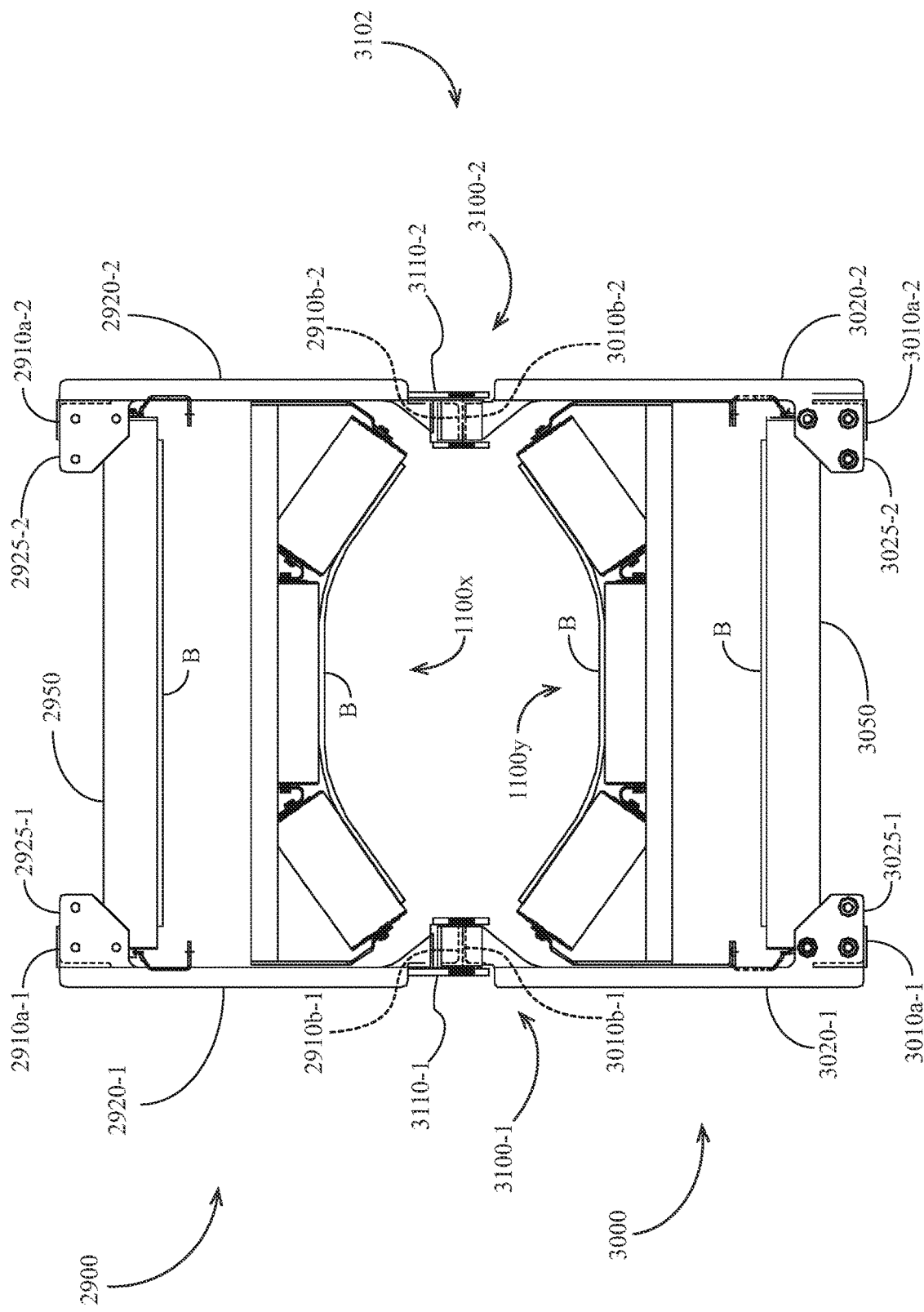
FIG. 30 is a partial front elevation view of the conveyor truss of FIG. 29 in a transport configuration.
Figure 31:
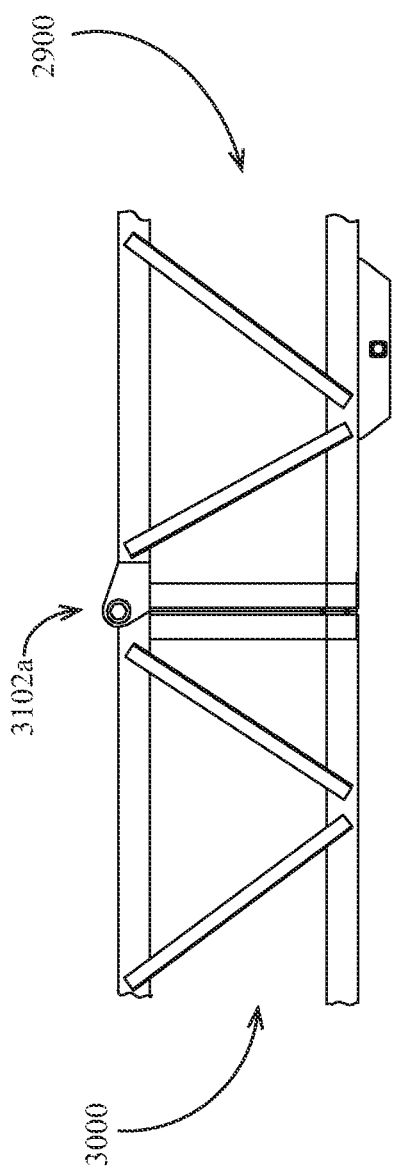
FIG. 31 is a partial side elevation view of the first pivot assembly on the first conveyor truss of FIG. 29 in an operational configuration.

Referring to FIG. 30, the hinges 3100-1 and 3100-2 optionally define a common pivot axis. For example, the pivots 3120 of both hinges and/or the opening in plates 3110 of both hinges are optionally aligned along a common axis.

In the operational configuration, the mounting plate 2925-1 is optionally in contact with the mounting plate 3025-1. The mounting plate 2925-1 is optionally mounted to the mounting plate 3025-1 in the operational configuration (e.g., by one or more fasteners such as nut-and-bolt assemblies). In the operational configuration, the mounting plate 2925-2 is optionally in contact with the mounting plate 3025-2. The mounting plate 2925-2 is optionally mounted to the mounting plate 3025-2 in the operational configuration (e.g., by one or more fasteners such as nut-and-bolt assemblies). In some alternative embodiments, adjacent frame sections may be rigidly coupled for prevention of relative pivotal motion (e.g., by welding of adjacent truss chords and/or end struts); in some such embodiments, the mounting plates may be omitted.

In some alternative embodiments, the pivotal connections between one or more pairs of frame sections may be omitted; for example, one or more frame sections may be configured to disconnect from an adjacent frame section and slide on top of another frame section (e.g., supported by rollers engaging the other frame section) for transport.

Unless otherwise indicated expressly or by the context or function of various components, in various embodiments the components described herein may be made of metal such as steel.

Ranges recited herein are intended to inclusively recite all values within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents.

The invention claimed is:

1. A folding conveyor, comprising:
a conveyor frame having a transport configuration and an operational configuration, said conveyor frame comprising a first frame section, a second frame section, and a third frame section, wherein when said conveyor frame is in said operational configuration, said conveyor frame has an upper end and a lower end, wherein at least one of the first, second and third frame sections comprise:
an upper truss chord;
a lower truss chord;
a plurality of struts mounted to said upper truss chord and said lower truss chord; and
a troughing idler assembly supported on first and second outer perch supports, wherein each of the first and second outer perch supports is disposed vertically between said upper truss chord and said lower truss chord;
a tail pulley operably supported on said conveyor frame, the tail pulley having a tail pulley rotational axis; and
a head pulley operably supported on said conveyor frame, the head pulley having a head pulley rotational axis, wherein said tail pulley and said head pulley are configured to support an endless belt, wherein a plane intersects both the tail pulley rotational axis and the head pulley rotational axis;
a first pivot assembly pivotally coupling said first frame section to said second frame section, said first pivot assembly defining a first pivot axis;
a second pivot assembly pivotally coupling said second frame section to said third frame section, said second pivot assembly defining a second pivot axis, wherein said first pivot axis is positioned on a first side of said plane and said second pivot axis is positioned on a second side of said plane, opposite of said first side.

2. The folding conveyor of claim 1, wherein said second frame section pivots relative to said first frame section about said first pivot assembly in a first rotational direction during reconfiguration from said operational configuration to said transport configuration, and wherein said third frame section pivots relative to said second frame section about said second pivot assembly in a second rotational direction during reconfiguration from said operational configuration to said transport configuration, wherein said first rotational direction is opposite said second rotational direction.

3. The folding conveyor of claim 1, wherein said second frame section pivots relative to said first frame section about said first pivot assembly in a first rotational direction during reconfiguration from said transport configuration to said operational configuration, and wherein said third frame section pivots relative to said second frame section about said second pivot assembly in a second rotational direction during reconfiguration from said transport configuration to said operational configuration, wherein said first direction is opposite said second direction.

4. The folding conveyor of claim 1, wherein each of said first, second, and third frame sections comprise upper and lower truss chords, wherein said first pivot assembly pivotally couples an upper truss chord of said first frame section to an upper truss chord of said second frame section, wherein said second pivot assembly couples a lower truss chord of said second frame section to a lower truss chord of said third frame section.

5. The folding conveyor of claim 1, wherein in said transport configuration said second frame section rests on said first frame section, wherein in said transport configuration said third frame section rests on said second frame section.

6. The folding conveyor of claim 1, wherein in said operational configuration, said first, second and third frame sections are generally aligned along a direction of travel of material on the conveyor.

7. The folding conveyor of claim 1, wherein at least one of said first and second frame sections are sized to be received in a shipping container when said conveyor frame is in said transport configuration.

8. The folding conveyor of claim 1, wherein an overall length of the folding conveyor in said transport configuration is less than a standard shipping container length.

9. The folding conveyor of claim 1, wherein said tail pulley has first and second outboard ends, wherein said tail pulley comprises first and second bearings, wherein said first and second bearings are disposed inboard of said first and second outboard ends.

10. A folding conveyor, comprising:
a conveyor frame having a transport configuration and an operational configuration, said conveyor frame comprising a first frame section, a second frame section, and a third frame section, wherein at least one of said first, second and third frame sections comprises:
an upper truss chord;
a lower truss chord;
a plurality of struts mounted to said upper truss chord and said lower truss chord and
a troughing idler assembly supported on first and second outer perch supports, wherein each of the first and second outer perch supports are disposed adjacent to a plane defined by outboard ends of said upper truss chord and said lower truss chord
a first pivot assembly pivotally coupling said first and second frame sections, the first pivot assembly defining a first pivot axis;
a second pivot assembly pivotally coupling said second and third frame sections, the second pivot assembly defining a second pivot axis, wherein said second frame section pivots relative to said first frame section about said first pivot axis in a first rotational direction during reconfiguration from said transport configuration to said operational configuration, and wherein said third frame section pivots relative to said second frame section about said second pivot axis in a second rotational direction during reconfiguration from said transport configuration to said operational configuration, wherein said first rotational direction is opposite said second direction;
a tail pulley operably supported on said conveyor frame; and
a head pulley operably supported on said conveyor frame, wherein said tail pulley and said head pulley are configured to support an endless belt.

11. The folding conveyor of claim 10, wherein each said frame section comprises upper and lower truss chords, wherein said first pivot assembly pivotally couples an upper truss chord of said first frame section to an upper truss chord of said second frame section, wherein said second pivot assembly couples a lower truss chord of said second frame section to a lower truss chord of said third frame section.

12. The folding conveyor of claim 11, wherein in said operational configuration, said first, second and third frame sections are generally parallel, and wherein in said transport configuration, said first, second and third frame sections are generally parallel and in a generally vertically stacked relation.

13. The folding conveyor of claim 10, wherein in said transport configuration said second frame section rests on said first frame section, wherein in said transport configuration said third frame section rests on said second frame section.

14. The folding conveyor of claim 10, wherein in said operational configuration, said first, second and third frame sections are generally aligned along a direction of travel of material on the conveyor.

15. The folding conveyor of claim 10, wherein at least one of said first and second frame sections have a length less than a length of a standard shipping container.

16. The folding conveyor of claim 10, wherein an overall length of the folding conveyor in said transport configuration is less than a standard shipping container length.

17. The folding conveyor of claim 10, wherein an overall width of at least one of said first, second and third frame sections is less than half of a width of a standard shipping container.

18. The folding conveyor of claim 10, wherein said tail pulley has first and second outboard ends, wherein said tail pulley comprises first and second bearings, wherein said first and second bearings are disposed inboard of said first and second outboard ends.

19. A method of folding a conveyor frame from a transport configuration to an operational configuration, comprising:
accessing a first frame section, a second frame section and a third frame section of the conveyor frame, each of the first, second and third frame sections comprising:
an upper truss chord;
a lower truss chord;
a plurality of struts mounted to said upper truss chord and said lower truss chord and
a troughing idler assembly supported on first and second outer perch supports, wherein each of the first and second outer perch supports is disposed vertically between said upper truss chord and said lower truss chord;
pivoting the third frame section relative to the second frame section in a first direction;
rigidly coupling said third frame section to said second frame section;
pivoting said second frame section relative to the first frame section in a second direction opposite to said first direction; and
rigidly coupling said second frame section to said first frame section.

20. A method of transitioning a conveyor frame from an operational configuration to a transport configuration, comprising:
accessing a first frame section, a second frame section and a third frame section of the conveyor frame, each of the first, second and third frame sections comprising:
an upper truss chord;
a lower truss chord;
a plurality of struts mounted to said upper truss chord and said lower truss chord and
a troughing idler assembly supported on first and second outer perch supports, wherein each of the first and second outer perch supports is disposed vertically between said upper truss chord and said lower truss chord;

disengaging a coupling between the third frame section and the second frame section;

pivoting the third frame section relative to the second frame section in a first rotational direction;

disengaging a coupling between the first frame section and the second frame section; and pivoting the second frame section relative to the first frame section in a second rotational direction opposite to said first rotational direction.

21. The method of claim 20, further comprising:
loading the conveyor frame onto a sea container.

22. The method of claim 21, wherein sea container is a standard-sized shipping container.

23. The method of claim 21, wherein the conveyor frame comprises a first conveyor frame, further comprising:
loading a second conveyor frame onto said sea container in side-by-side relation with the first conveyor frame.

24. The method of claim 23, further comprising:
positioning a first strut of said first conveyor frame and a second strut of said second conveyor frame between a first truss chord of said first conveyor frame and a second truss chord of said second conveyor frame, wherein said first strut is mounted to said first truss chord, and wherein said second strut is mounted to said second truss chord.

25. A folding conveyor frame assembly having a transport configuration and an operational configuration, comprising:
a first frame;
a second frame;
a third frame;
wherein said first, second and third frames each comprise:
an upper truss chord;
a lower truss chord;
a plurality of struts mounted to said upper truss chord and said lower truss chord; and
a cross brace and outer perch supports supported by the cross brace, wherein the outer perch supports are disposed vertically between said upper truss chord and said lower truss chord;
a first pivot assembly pivotally coupling said first frame to said second frame, the first pivot assembly having a first pivot; and
a second pivot assembly pivotally coupling said second frame to said third frame, the second pivot assembly having second pivot, wherein said second frame pivots relative to said first frame about said first pivot in a first pivotal direction for reconfiguration of the conveyor frame assembly from the transport configuration to the operational configuration, and wherein said third frame pivots relative to said second frame about said second pivot in a second pivotal direction for reconfiguration of the conveyor frame assembly from the transport configuration to the operational configuration, wherein said first pivotal direction is opposite said second pivotal direction.

26. The folding conveyor frame assembly of claim 25, wherein in the operational configuration a first plane is defined by the upper truss chord of said first frame and the upper truss chord of said second frame, wherein in the operational configuration a second plane is defined by the lower truss chord of said second frame and the lower truss chord of said third frame, wherein said first pivot is disposed at or above said first plane in the operational configuration when the conveyor frame assembly is oriented horizontally, wherein said second pivot is disposed at or below said second plane in the operational configuration when the conveyor frame assembly is oriented horizontally.

27. The folding conveyor frame assembly of claim 25, wherein the first, second and third frames are disposed in vertically stacked relation in the transport configuration.

28. The folding conveyor frame assembly of claim 27, wherein an overall transport length of the folding conveyor frame assembly in the transport configuration is less than a standard container length, and wherein an overall operational length of the folding conveyor frame assembly in the operational configuration is greater than said standard container length.

29. The folding conveyor frame assembly of claim 25, wherein said first frame includes a first connection for coupling said first frame to an undercarriage, and wherein said second frame includes a second connection for coupling said second frame to a brace.

30. The folding conveyor frame assembly of claim 25, wherein said first frame is selectively rigidly coupled to said second frame in the operational configuration, and wherein said second frame is selectively rigidly coupled to said third frame in the operational configuration.

* * * * *